US012032315B2

(12) United States Patent
Dokiya et al.

(10) Patent No.: US 12,032,315 B2
(45) Date of Patent: Jul. 9, 2024

(54) PAPER DISCRIMINATING DEVICE, IMAGE FORMING APPARATUS, PAPER TYPE DISCRIMINATING METHOD, AND RECORDING MEDIUM

(71) Applicant: KONICA MINOLTA, INC., Tokyo (JP)

(72) Inventors: Shohei Dokiya, Hino (JP); Daisuke Kobayashi, Hino (JP); Masahiko Takahashi, Hino (JP); Takaki Uemura, Seto (JP); Makoto Ooki, Toyohashi (JP); Takafumi Yuasa, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 18/072,643

(22) Filed: Nov. 30, 2022

(65) Prior Publication Data

US 2023/0185223 A1 Jun. 15, 2023

(30) Foreign Application Priority Data

Dec. 10, 2021 (JP) ................................ 2021-200997

(51) Int. Cl.
*G03G 15/00* (2006.01)

(52) U.S. Cl.
CPC ................................ *G03G 15/5029* (2013.01)

(58) Field of Classification Search
CPC ................. G03G 15/5029; G03G 2215/00616
See application file for complete search history.

(56) References Cited

U.S. PATENT DOCUMENTS

2005/0219305 A1 10/2005 Kikuchi et al.
2013/0127946 A1 5/2013 Kanai
2014/0192361 A1 7/2014 Endo et al.
2015/0339558 A1 11/2015 Kanai
2019/0162672 A1 * 5/2019 Sakakibara ............ G01N 21/31
2020/0122481 A1 * 4/2020 Asaoka .............. G03G 15/5029
2020/0122482 A1 4/2020 Asaoka

FOREIGN PATENT DOCUMENTS

JP 2002-167082 A 6/2002
JP 2005-315856 A 11/2005
JP 2006-016166 A 1/2006
JP 2013-107269 A 6/2013
JP 2014-145760 A 8/2014
JP 2015-221509 A 12/2015
JP 2020-064003 A 4/2020

* cited by examiner

*Primary Examiner* — Sandra Brase
(74) *Attorney, Agent, or Firm* — Squire Patton Boggs (US) LLP

(57) ABSTRACT

A technology aimed at improvement of paper discriminating accuracy is provided. In an image forming apparatus, a control unit derives a discriminating result for types of paper. To be specific, the control unit derives the discriminating result for types of paper using a first detection value based on absorption by the paper of the light having the first wavelength and a second detection value based on absorption by the paper of the light having the second wavelength. The first wavelength ranges from 750 nm to 1100 nm. The second wavelength ranges from 400 nm to 500 nm.

29 Claims, 26 Drawing Sheets

FIG.13

| DISCRIMINATING INDEX A | DISCRIMINATING INDEX B | DISCRIMINATING INDEX C | DISCRIMINATING RESULT |
|---|---|---|---|
| YES | YES | YES | PAPER TYPE A |
| YES | YES | NO | PAPER TYPE A |
| YES | NO | YES | PAPER TYPE B |
| YES | NO | NO | PAPER TYPE B |
| NO | YES | YES | PAPER TYPE C |
| NO | YES | NO | PAPER TYPE B |
| NO | NO | YES | PAPER TYPE C |
| NO | NO | NO | PAPER TYPE B |

FIG.17

| COORDINATES IN [REFLECTIVITY V-IR] ARE LESS THAN FIRST THRESHOLD (INDEX IN STEP SA10) | COORDINATES IN [TRANSMISSIVITY IR-B] ARE LESS THAN SECOND THRESHOLD (INDEX IN STEP SA12) | COORDINATES IN [TRANSMISSIVITY IR-B] ARE LESS THAN THIRD THRESHOLD (INDEX IN STEP SA14) | DISCRIMINATING RESULT |
|---|---|---|---|
| YES | YES | YES | RECYCLED PAPER/ MECHANICAL PAPER |
| YES | YES | NO | RECYCLED PAPER/ MECHANICAL PAPER |
| YES | NO | YES | REGULAR PAPER |
| YES | NO | NO | REGULAR PAPER |
| NO | YES | YES | COATED PAPER |
| NO | YES | NO | REGULAR PAPER |
| NO | NO | YES | COATED PAPER |
| NO | NO | NO | REGULAR PAPER |

FIG.22

| COORDINATES IN [REFLECTIVITY R–IR] ARE LESS THAN FOURTH THRESHOLD (INDEX IN STEP SA01) | COORDINATES IN [REFLECTIVITY G–IR] ARE LESS THAN FIFTH THRESHOLD (INDEX IN STEP SA02) | COORDINATES IN [REFLECTIVITY V–IR] ARE LESS THAN FIRST THRESHOLD (INDEX IN STEP SA10) | COORDINATES IN [REFLECTIVITY IR–B] ARE LESS THAN SECOND THRESHOLD (INDEX IN STEP SA12) | COORDINATES IN [REFLECTIVITY IR–B] ARE LESS THAN THIRD THRESHOLD (INDEX IN STEP SA14) | DISCRIMINATING RESULT |
|---|---|---|---|---|---|
| YES | – | – | – | – | COLORED PAPER |
| NO | YES | – | – | – | COLORED PAPER |
| NO | NO | YES | YES | YES | RECYCLED PAPER/ MECHANICAL PAPER |
| NO | NO | YES | YES | NO | RECYCLED PAPER/ MECHANICAL PAPER |
| NO | NO | YES | NO | YES | REGULAR PAPER |
| NO | NO | YES | NO | NO | REGULAR PAPER |
| NO | NO | NO | YES | YES | COATED PAPER |
| NO | NO | NO | YES | NO | REGULAR PAPER |
| NO | NO | NO | NO | YES | COATED PAPER |
| NO | NO | NO | NO | NO | REGULAR PAPER |

"–" INDICATES EITHER OF YES OR NO IS APPLICABLE

PAPER DISCRIMINATING DEVICE, IMAGE FORMING APPARATUS, PAPER TYPE DISCRIMINATING METHOD, AND RECORDING MEDIUM

The entire disclosure of Japanese Patent Application No. 2021-200997, filed on Dec. 10, 2021, is incorporated herein by reference in its entirety.

BACKGROUND

Technological Field

This disclosure relates to a paper discriminating technique available in image forming apparatuses.

Description of the Related Art

Various studies and discussions have been and are currently conducted on how to discriminate among types of paper used in image forming apparatuses, for example, MFP (Multi-Functional Peripheral) devices (for example, refer to Japanese Laid-Open Patent Publication No. 2002-167082, Japanese Laid-Open Patent Publication No. 2005-315856, Japanese Laid-Open Patent Publication No. 2006-016166, Japanese Laid-Open Patent Publication No. 2013-107269, Japanese Laid-Open Patent Publication No. 2014-145760, Japanese Laid-Open Patent Publication No. 2015-221509, and Japanese Laid-Open Patent Publication No. 2020-064003). Of these, Japanese Laid-Open Patent Publication No. 2013-107269, Japanese Laid-Open Patent Publication No. 2014-145760, Japanese Laid-Open Patent Publication No. 2015-221509, and Japanese Laid-Open Patent Publication No. 2020-064003 describe technologies developed to derive the basis weights of recording materials from the quantities of transmitted pieces of light having two different wavelengths.

A more advanced technology is desirably developed and made available that can achieve a higher level of accuracy in discriminating types of paper.

To address these issues of the known art, this disclosure is directed to providing a technology that can achieve a higher level of accuracy in discriminating types of paper.

SUMMARY

To achieve at least one of the abovementioned objects, according to an aspect of the present invention, a paper discriminating device reflecting one aspect of the disclosure comprises: a light source unit that emits pieces of light having two or more wavelengths onto paper; and a detecting unit that obtains a detection result based on absorption by the paper of each of the pieces of light having two or more wavelengths. The pieces of light having two or more wavelengths include light having a first wavelength and light having a second wavelength. The detection result includes a first detection value based on absorption by the paper of the light having the first wavelength, and further includes a second detection value based on absorption by the paper of the light having the second wavelength. This device further includes a control unit that derives a discriminating result for types of the paper using the first and second detection values. The first wavelength is a wavelength in a range of 750 nm to 1100 nm, and the second wavelength is a wavelength in a range of 400 nm to 500 nm.

According to another aspect of this disclosure, a paper discriminating device is provided. The paper discriminating device includes: a light source unit that emits pieces of light having two or more wavelengths onto paper; a detecting unit that obtains a detection result based on absorption by the paper of each of the pieces of light having two or more wavelengths; and a control unit that derives a discriminating result for types of the paper provided that the detection result satisfies two or more conditions.

According to yet another aspect of this disclosure, an image forming apparatus is provided. The image forming apparatus includes the paper discriminating device characterized as described earlier, and an image forming unit that forms an image on the paper.

According to yet another aspect of this disclosure, a paper discriminating method is provided. The paper discriminating method includes: emitting pieces of light having two or more wavelengths onto paper; and obtaining a detection result based on absorption by the paper of each of the pieces of light having two or more wavelengths. The pieces of light having two or more wavelengths include light having a first wavelength and light having a second wavelength. The detection result includes a first detection value based on absorption by the paper of the light having the first wavelength, and further includes a second detection value based on absorption by the paper of the light having the second wavelength. This method further includes deriving a discriminating result for types of the paper using the first and second detection values. The first wavelength is a wavelength in a range of 750 nm to 1100 nm, and the second wavelength is a wavelength in a range of 400 nm to 500 nm.

According to another aspect of this disclosure, a paper discriminating method is provided. The paper discriminating method includes: emitting pieces of light having two or more wavelengths onto paper; obtaining a detection result based on absorption by the paper of each of the pieces of light having two or more wavelengths; and deriving a discriminating result for types of the paper provided that the detection result satisfies two or more conditions.

According to another aspect of this disclosure, a computer-readable recording medium is provided. In this recording medium, a program is stored in a non-transitory manner, and the program is executable by a computer to prompt the computer to carry out the paper discriminating method.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 13 is a table showing a relationship between discriminating indexes and discriminating results in the process of FIG. 12.

FIG. 17 is a table showing a relationship between discriminating indexes and discriminating results in the process of FIG. 16.

FIG. 22 is a table showing a relationship between discriminating indexes and discriminating results in the process of FIG. 21.

DETAILED DESCRIPTION OF EMBODIMENTS

Hereinafter, one or more embodiments of the present invention will be described with reference to the drawings. However, the scope of the invention is not limited to the disclosed embodiments.

Embodiments of the technology disclosed herein are hereinafter described referring to the accompanying drawings. In the description below, like components and technical or structural features are illustrated with the same reference signs. Also, they are referred to likewise and have similar functional features. Such components and technical or structural features, therefore, will not be repeatedly described in detail.

[1. Structure of Image Forming Apparatus]

Figure 1:
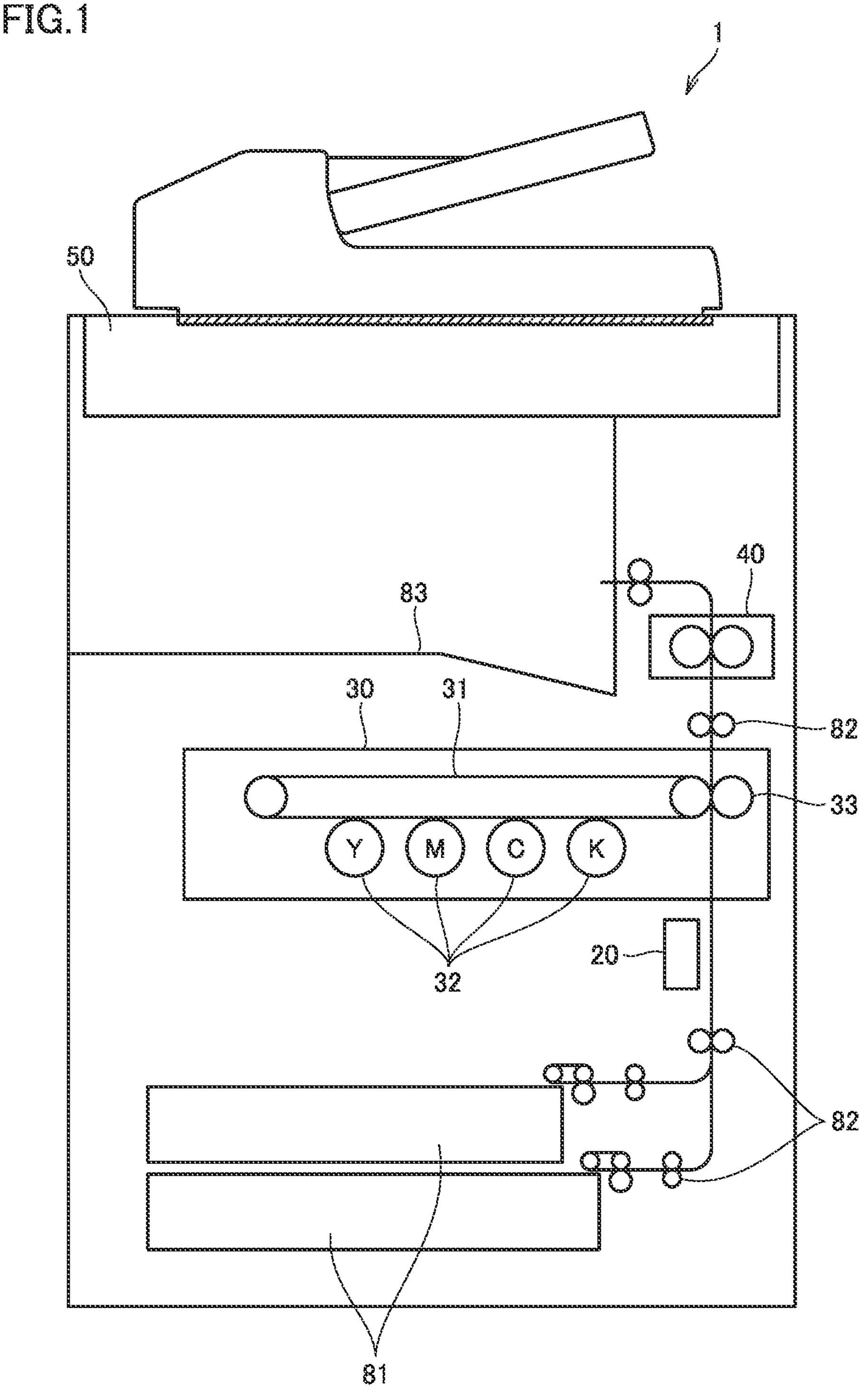
FIG. 1 is a drawing that schematically illustrates the structural features of an image forming apparatus 1 according to an embodiment of this disclosure.
Figure 2:
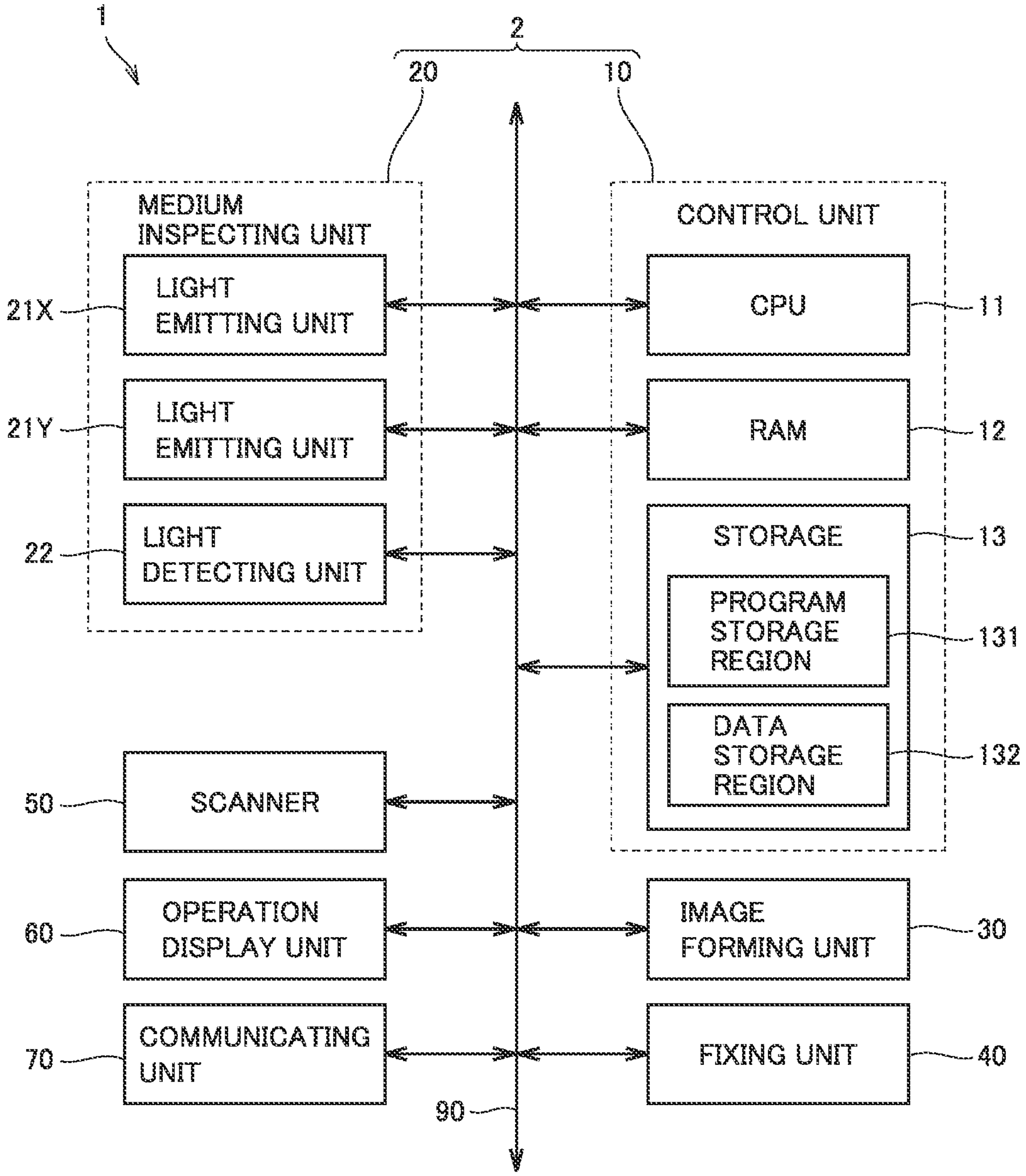
FIG. 2 is a block diagram of the image forming apparatus 1.

FIG. 1 is a drawing that schematically illustrates the structural features of an image forming apparatus 1 according to an embodiment of this disclosure. FIG. 2 is a block diagram of the image forming apparatus 1.

Image forming apparatus 1 is an MFP (Multifunction Peripheral) that forms an image on a recording material by electrophotography. Image forming apparatus 1 includes a control unit 10, a medium inspecting unit 20, an image forming unit 30, a fixing unit 40, a scanner 50, an operation display unit 60, a communicating unit 70, a paper feed tray 81, a transport roller 82, a paper ejection tray 83, and a bus 90.

As illustrated in FIG. 2, control unit 10 and medium inspecting unit 20 constitute a recording material discriminating device 2 that discriminates among recording materials of different types. The structural elements of image forming apparatus 1 are interconnected with bus 90.

Control unit 10 includes a CPU 11 (Central Processing Unit), a RAM 12 (Random Access Memory), and a storage 13.

Storage 13 may include, for example, HDD (Hard Disk Drive), SSD (Flash Solid State Drive) and a non-volatile storage device like a flash memory. Storage 13 includes a program storage region 131 and a data storage region 132. In program storage region 131, pieces of data of various programs are stored in a non-transitory manner. Program storage region 13 may be a recording medium mountable to and removable from image forming apparatus 1. In data storage region 132 are storable, for example, image data obtained by scanner 50, input image data received from outside through communicating unit 70 and/or reference data used in the recording material discriminating process described later.

CPU 11 reads a program stored in program storage region 131 of storage 13 (or program stored in a storage device on the outside of image forming apparatus 1) and runs the read program to execute various computing processes.

RAM 12 provided CPU 11 with a memory space; working region, in which the data is temporarily storable.

By having the program run by CPU 11, control unit 10 is allowed to perform overall control of the structural elements of image forming apparatus 1. For example, control unit 10, based on the image data stored in storage 13, prompts the structural elements of image forming unit 30, transport roller 82 and fixing unit 40 to operate to form an image on the recording material. In accordance with a discriminating result on the recording material obtained by recording material discriminating device 2, CPU 11 selects one of and switches to the other one of image formation-related operations by the structural elements of image forming apparatus 1. For example, the transport speed and/or gripping pressure of transport roller 82 are changed in accordance with the type of a recording material used. Further, the heating temperature and/or applied pressure of fixing unit 40 are changed in accordance with the type of a recording material.

Control unit 10 may include, instead of or in addition to CPU 11, a dedicated circuit(s) to enable intended functions, for example, ASIC (application specific integrated circuit) and/or FPGA (field-programmable gate array).

Medium inspecting unit 20 is disposed at a position upstream relative to image forming unit 30 along a transport path for the recording material extending from paper feed tray 81 to paper ejection tray 83. Medium inspecting unit 20 may instead be disposed at any other optional position along the transport path.

Medium inspecting unit 20 includes a light emitting unit 21X, a light emitting unit 21Y, and a light detecting unit 22.

Light emitting units 21X and 21Y are each prompted by control unit 10 to emit an inspection light onto the transport path.

Light detecting unit 22 detects the inspection light directed onto the transport path. The light thus detected includes a reflected light reflected from the recording material and a transmitted light transmitted through the recording material.

Image forming unit 30 applies a toner (coloring material) to the recording material supplied from paper feed tray 81 and thereby forms an image on the recording material. Image forming unit 30 includes an intermediate transfer belt 31, an image forming unit 32, and transfer rollers 33. Intermediate transfer belt 31 is an endless member in the form of a band. This belt is wound around a plurality of rollers and rotates on these rollers in a circular motion. Image forming unit 32 is disposed along intermediate transfer belt 31. Image forming unit 32 forms toner images of C (cyan), M (magenta), Y (yellow) and K (black) on intermediate transfer belt 31 based on image data of an image to be printed. When the recording material is passing through a nip part between intermediate transfer belt 31 and transfer rollers 33, the toner images are transferred onto and formed on the recording material. Image forming unit 30 according to this embodiment is equipped to form color images. Instead, image forming unit 30 may be equipped to form black-and-white images.

fixing unit 40 applies a pressure and heat to the recording material on which the toner images have been transferred to fix the toner images to the recording material. fixing unit 40 includes a pair of rollers; a heating roller and a pressurizing roller that hold the recording material therebetween. The recording material with the toner images being fixed thereon is transported by transport rollers 82 to paper ejection tray 83. Conditions set for the pressure and heat applied by fixing unit 40 are controlled by control unit 10 in accordance with the type of the recording material.

Scanner 50 includes an optical system including, for example, light source and reflecting mirror, and an imaging element. The recording material may be transported on a predetermined transport path or disposed on platen glass, from which scanner 50 reads images thereon and generates image data in the bitmap format for each of colors R (red), G (green) and B (blue). The generated image data is stored in storage 13. Through the image formation based on this image data by image forming unit 30, the read images may be copied onto another recording material.

Operation display unit 60 includes a display like a liquid crystal display, a touch panel on a display screen, and an input device including operation keys. Operation display unit 60 displays, on the display, operational statuses and processing results of image forming apparatus 1. Further, operation display unit 60 converts a user's input to the input device into an operation signal and then outputs the signal to control unit 10.

Communicating unit 70 includes a network card. Communicating unit 70 is connected to a communication network like LAN (Local Area Network), to transmit and receive information to and from an external device(s) on the communication network. Control unit 10 communicates with an external device(s) on the communication network through communicating unit 70.

Paper feed tray 81 contains recording materials before image formation. Paper feed tray 81 contains a plurality of types of recording materials.

The type of a recording material is characterized by at least one of properties of the recording material among its material (raw material), color, surface treatment condition, whether a fluorescent whitening agent is used and its quantity if used, and whether blue tinting is employed. Thus, any recording materials that differ in at least one of these properties are defined as recording materials of different types that are distinct from each other. Examples of the recording material to be fed into paper feed tray 81 may include, for example, regular paper, mechanical paper and recycled paper. The recording materials to be fed into paper feed tray 81 are not necessarily limited to these examples.

The regular paper is a type of paper produced from pulp made of lumber as its main raw material (typically chemical pulp, any pulp not reproduced from used paper).

The mechanical paper is a type of paper produced from, for example, mechanical pulp as its main raw material. The regular paper is bleached, while the mechanical paper is not bleached, which may be used as a distinction between the regular paper and the mechanical paper.

The recycled paper is a type of paper containing recycled paper pulp produced from used paper at a ratio greater than or equal to a predetermined ratio.

Transport rollers 82 rotate with a piece of recording medium being held therebetween and thus transport the recording material along the transport path. The timing and speed of transport by transport rollers 82 are controlled by control unit 10 in accordance with the type of the recording material used.

Paper ejection tray 83 retains the image-formed recording material until it is pick up by a user.

[2. Structure of Medium Inspecting Unit]

Figure 3:
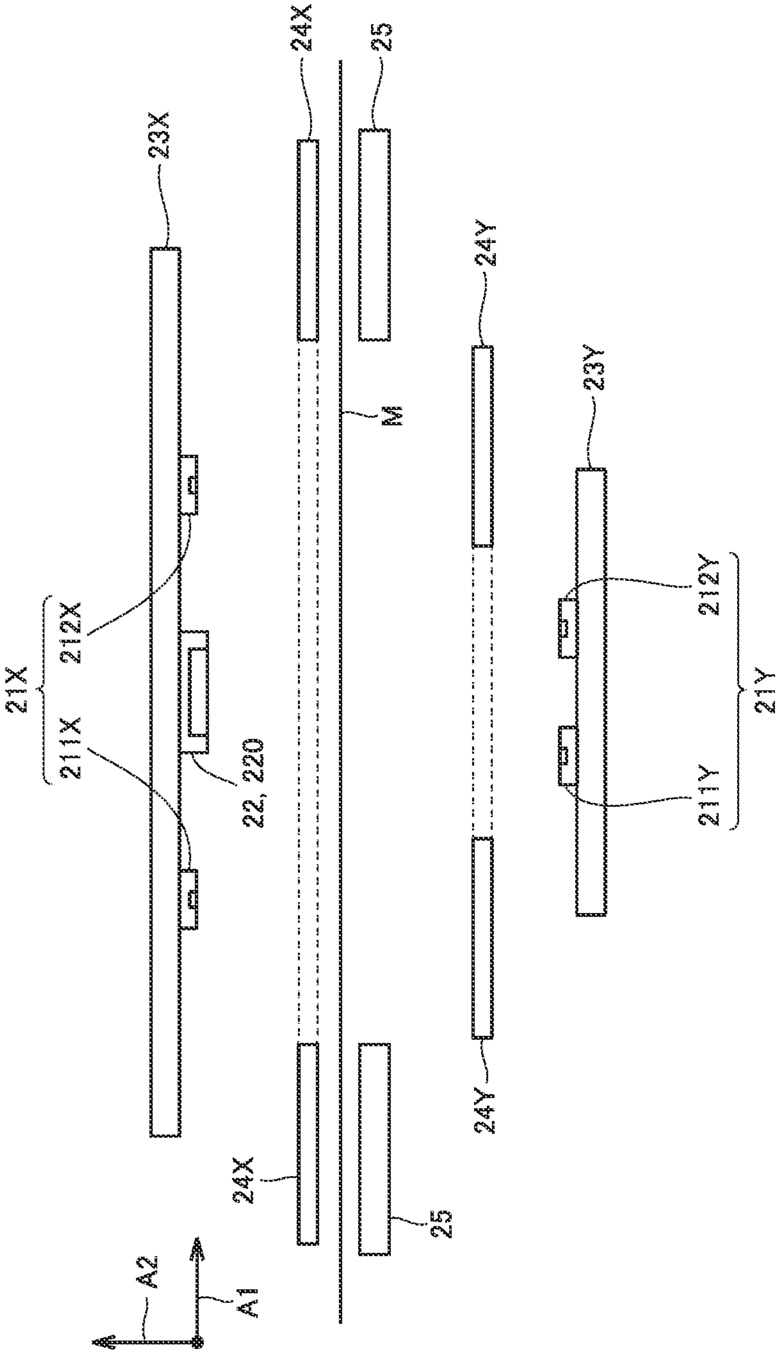
FIG. 3 is a drawing that illustrates the structural features of a medium inspecting unit 20.

Referring to FIG. 3, medium inspecting unit 20 is hereinafter described. FIG. 3 is a drawing that illustrates the structural features of a medium inspecting unit 20.

In FIG. 3, the recording material is illustrated with a reference sign "M". The arrow A1 indicates a direction in which recording material M is transported on the transport path. The arrow A2 indicates a direction perpendicular to the surfaces of recording material M being transported.

Medium inspecting unit 20 includes element substrates 23X and 23Y. These element substrates are disposed at positions at which they face the surfaces of recording material M on the transport path (or at positions at which these substrates face recording material M being transported on the transport path). Medium inspecting unit 20 further includes a paper-feed guide 25 and optical diaphragms 24X and 24Y. Paper-feed guide 25 supports recording material M to allow its transport along the transport path. Optical diaphragms 24X and 24Y are disposed between recording material M and element substrates 23X and 23Y.

Element substrates 23X and 23Y are disposed with their main surfaces being perpendicular to the z direction.

On the surface of element substrate 23X facing recording material M are disposed a first luminous element 211X, a second luminous element 212X, and a light receiving element 220. First and second luminous elements 211X and 212X are structural elements of light emitting unit 21X. First luminous element 211X emits light having a first wavelength, while second luminous element 212X emits light having a second wavelength. In a practical example, the "light having a first wavelength" may refer to light with a peak at a wavelength identified as the "first wavelength". Likewise, the "light having a second wavelength" may refer to light with a peak at a wavelength identified as the "second wavelength".

A light receiving element 220 is a structural element of light detecting unit 22. Light detecting unit 22 has one light receiving element 220. Light receiving element 220 outputs a photoelectric current that corresponds to a quantity of incident light. Light detecting unit 22 converts this photoelectric current into a voltage and then into digital data, and then outputs the digital data to control unit 10.

On the surface of element substrate 23Y facing recording material M are disposed a first luminous element 211Y and a second luminous element 212Y. First and second luminous elements 211Y and 212Y are structural elements of light emitting unit 21Y. First luminous element 211Y emits light having a first wavelength, while second luminous element 212Y emits light having a second wavelength.

Optical diaphragms 24X and 24Y are plate-like members disposed with their main surfaces being perpendicular to the arrow A2*z* direction.

Light receiving element 220 is disposed between first luminous element 211X and second luminous element 212X. An equal distance may preferably be provided between first luminous element 211X and light receiving element 220, and between second luminous element 212X and light receiving element 220.

Recording material M is transported in an interval between optical diaphragm 24X and paper-feed guide 25. This interval has a width in the arrow A2 direction. The position at which recording material M passes through this interval is displaceable in the arrow A2 direction within the range of this width. Distances of recording material M to first luminous element 211X, second luminous element 212X and light receiving element 220 may change in response to possible changes of the passing position of recording material M. First luminous element 211X, second luminous element 212X and light receiving element 220 are all disposed on the same plane of element substrate 23X. Therefore, any impact of such distance changes on a reflected light-based detection result by medium inspecting unit 20 may be reducible to the minimum.

Figure 4:
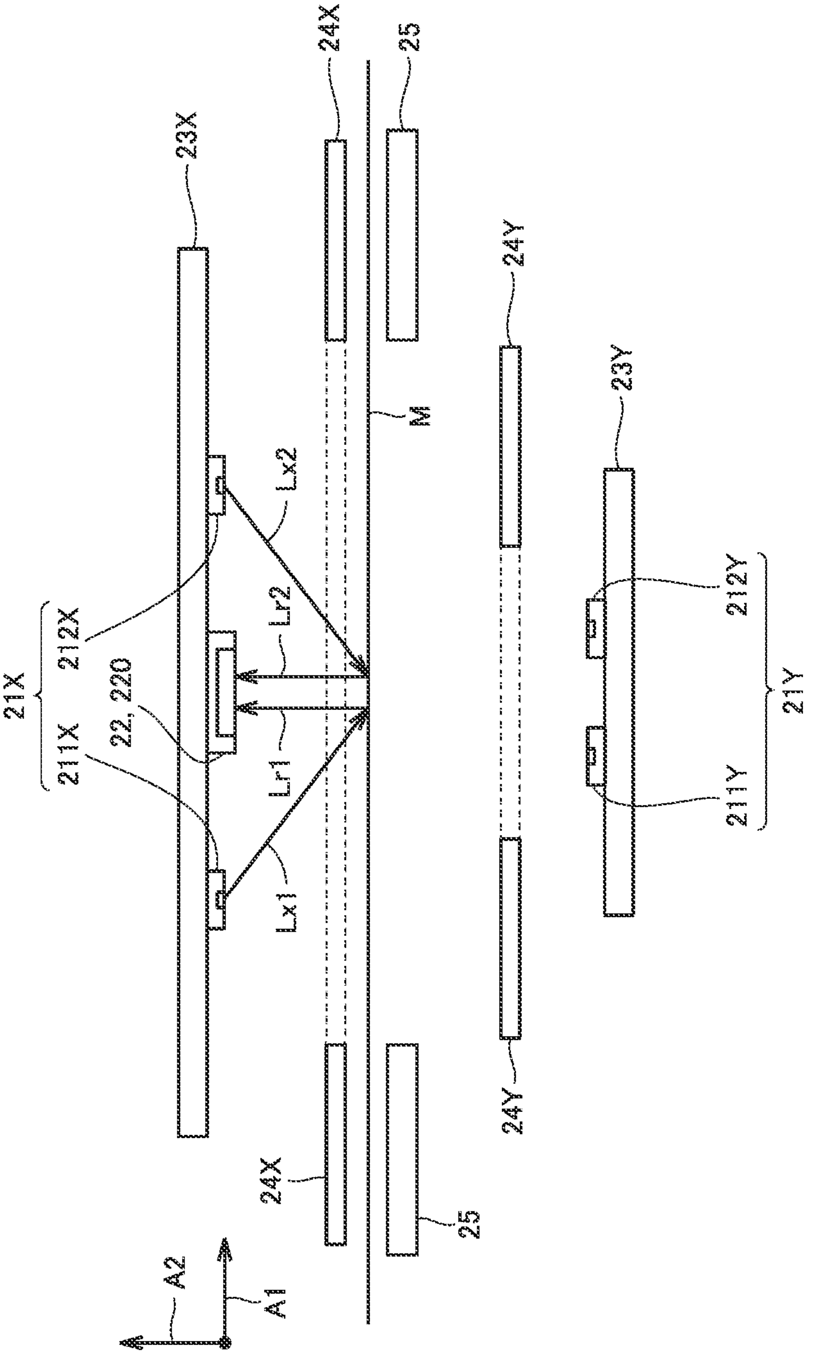
FIG. 4 is a drawing that illustrates how a reflected light is detectable in the image forming apparatus 1.

FIG. 4 is a drawing that illustrates how a reflected light is detectable in the image forming apparatus 1. First luminous element 211X irradiates recording material M with a first inspection light Lx1. Second luminous element 212X irradiates recording material M with a second inspection light Lx2.

Optical diaphragm 24X has an opening in a range including parts facing first luminous element 211X, second luminous element 212X and light receiving element 220. First inspection light Lx1 and second inspection light Lx2 enter through this opening into recording material M. Optical diaphragm 24X has, in any part but the opening, a light blocking effect, which serves to block any light but the inspection light from entering recording material M.

A reflected light Lr1 and a reflected light Lr2 are generated as a result of first inspection light Lx1 and second inspection light Lx2 being reflected by recording material M. Reflected light Lr1 and a reflected light Lr2 then enter light receiving element 220. Light receiving element 220 detects the quantities of reflected light Lr1 and reflected light Lr2. The quantity of reflected light Lr1 is affected by absorption characteristics of recording material M for absorption of the first wavelength light. The quantity of reflected light Lr2 is affected by absorption characteristics of recording material M for absorption of the second wavelength light. Thus, the quantity of reflected light Lr1 is an exemplified first detection value based on absorption of the first wavelength light by the recording material. The quantity of reflected light Lr2 is an exemplified second detection value based on absorption of the second wavelength light by the recording material.

Figure 5:
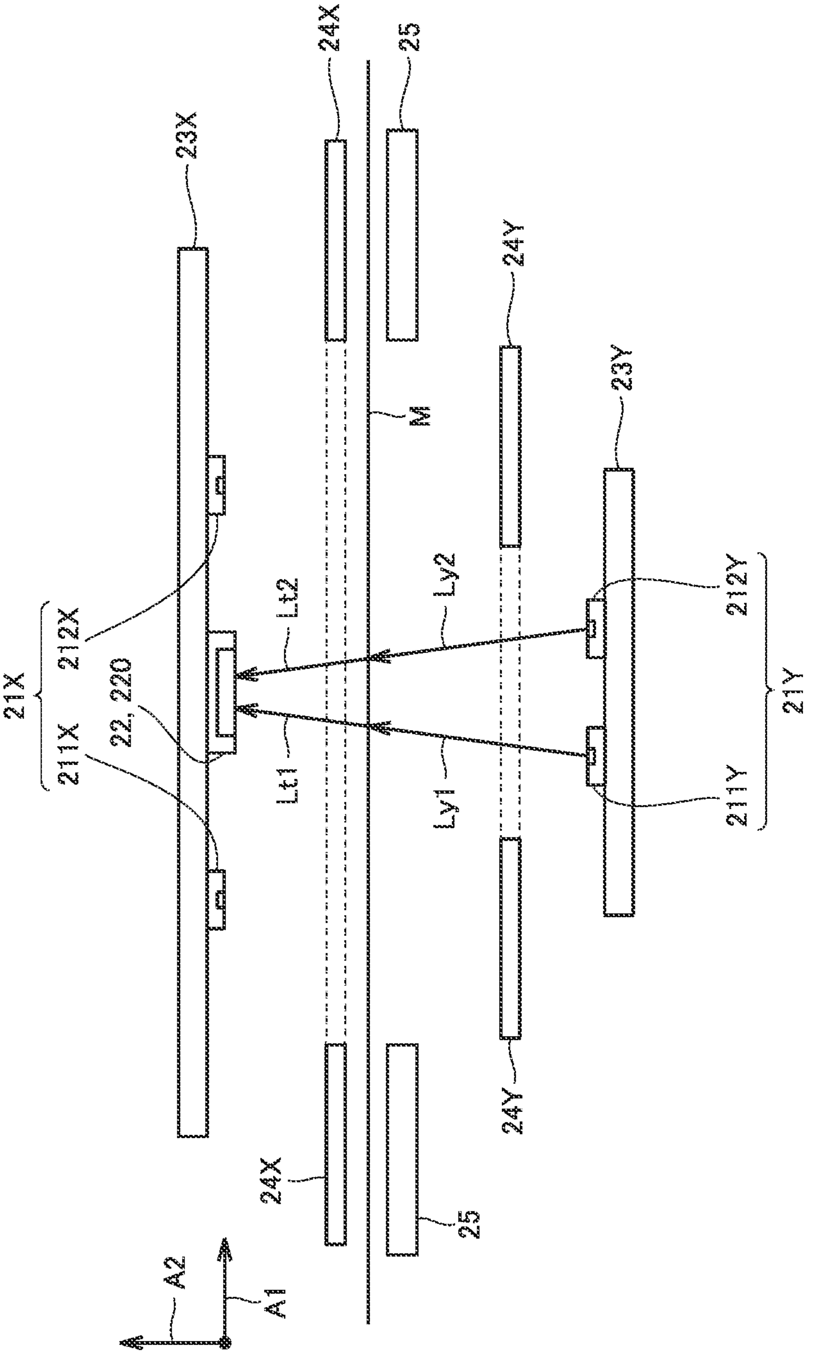
FIG. 5 is a drawing that illustrates how a transmitted light is detectable in the image forming apparatus 1.

FIG. 5 is a drawing that illustrates how a transmitted light is detectable in the image forming apparatus 1. First luminous element 211Y irradiates recording material M with first inspection light Ly1. Second luminous element 212Y irradiates recording material M with second inspection light Ly2.

Optical diaphragm 24Y has an opening in a range including parts facing first luminous element 211Y and second luminous element 212Y. First inspection light Ly1 and second inspection light Ly2 enter through this opening into recording material M. Optical diaphragm 24Y has, in any part but the opening, a light blocking effect, which serves to block any light but the inspection light from entering recording material M.

A transmitted light Lt1 and a transmitted light Lt2 are generated as a result of first inspection light Ly1 and second inspection light and Ly2 being transmitted through recording material M. Then, transmitted light Lt1 and a transmitted light Lt2 enter light receiving element 220. Light receiving element 220 detects the quantities of transmitted light Lt1 and transmitted light Lt2. The quantity of transmitted light Lt1 is affected by absorption characteristics of recording material M for absorption of the first wavelength light. The quantity of transmitted light Lt2 is affected by absorption characteristics of recording material M for absorption of the second wavelength light. Thus, the quantity of transmitted light Lt1 is an exemplified first detection value based on absorption of the first wavelength light by the recording material. The quantity of transmitted light Lt2 is an exemplified second detection value based on absorption of the second wavelength light by the recording material.

[3. Example of Light Wavelength Used to Discriminate Between Recording Materials]

Figure 6:
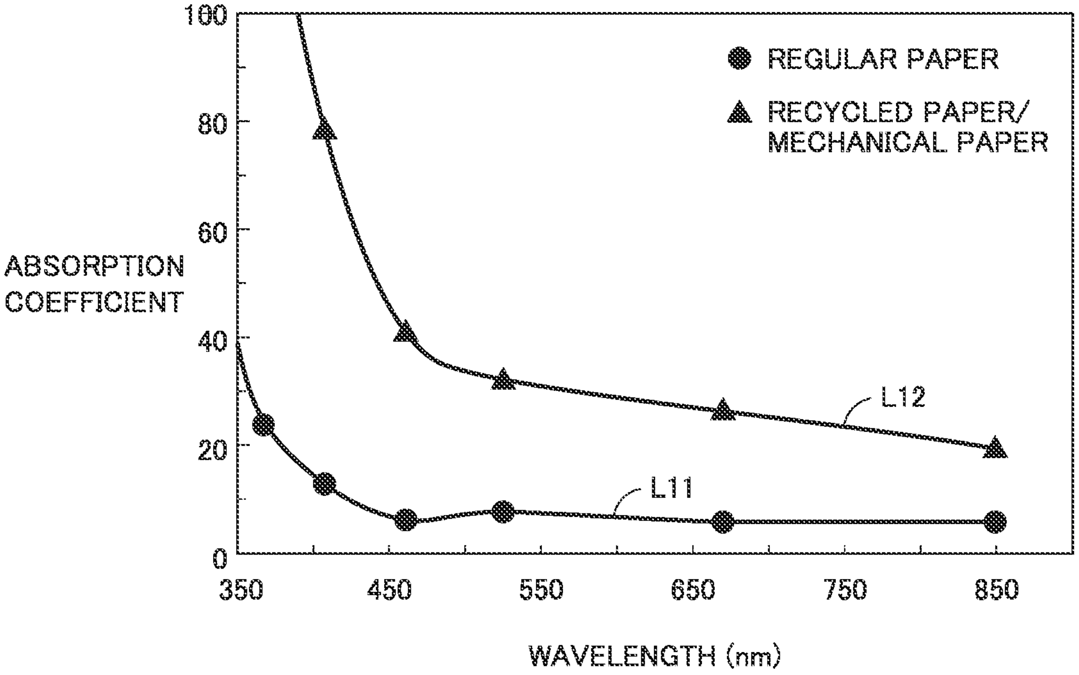
FIG. 6 is a graph showing exemplified changes of an absorption coefficient with wavelengths in recording materials M of two different types.

FIG. 6 is a graph showing exemplified changes of an absorption coefficient with wavelengths in recording materials M of two different types. A line L11 represents changes in the regular paper. A line L12 represents changes in the recycled paper/mechanical paper (changes of the recycled and mechanical papers combined).

As illustrated with line L12, the recycled paper/mechanical paper resulted in a significant difference between absorption coefficients at the wavelength of around 460 nm and the wavelength of around 850 nm. On the other hand, the regular paper shows no particular difference between absorption coefficients at the wavelength of around 460 nm and the wavelength of around 850 nm, as indicated by line L11. As for changes in the recycled paper/mechanical paper, such a difference between the absorption coefficients at the wavelengths of around 460 nm and around 850 nm certainly exhibited a wavelength dependence. As for changes in the regular paper, on the other hand, a wavelength dependence was hardly exhibited because of no particular difference between the absorption coefficients at the wavelengths of around 460 nm and around 850 nm.

In a practical example, pieces of light with wavelength ranges including these two wavelengths are used to allow the recording material types to be discriminated from one another depending on whether the wavelength dependence exists; one is near-infrared light with a wavelength range including 850 nm used as the first wavelength light, and the other one is blue light with a wavelength range including 460 nm used as the second wavelength light.

<First Wavelength>

As the first wavelength light may be used, for example, light with a wavelength ranging from 750 nm to 1100 nm.

The wavelength greater than or equal to 750 nm may preferably be used because any light with a shorter wavelength than 750 nm may be affected by blue tinting applied to recording material M in the papermaking process. The blue tinting may be employed mostly when paper is used as recording material M. Describing the blue tinting, a colorant for blue color is added to the paper to improve the level of whiteness. This colorant absorption may reduce the reflectivity of any wavelength region but the blue wavelength region, while improving the reflectivity of the blue wavelength region.

Figure 7:
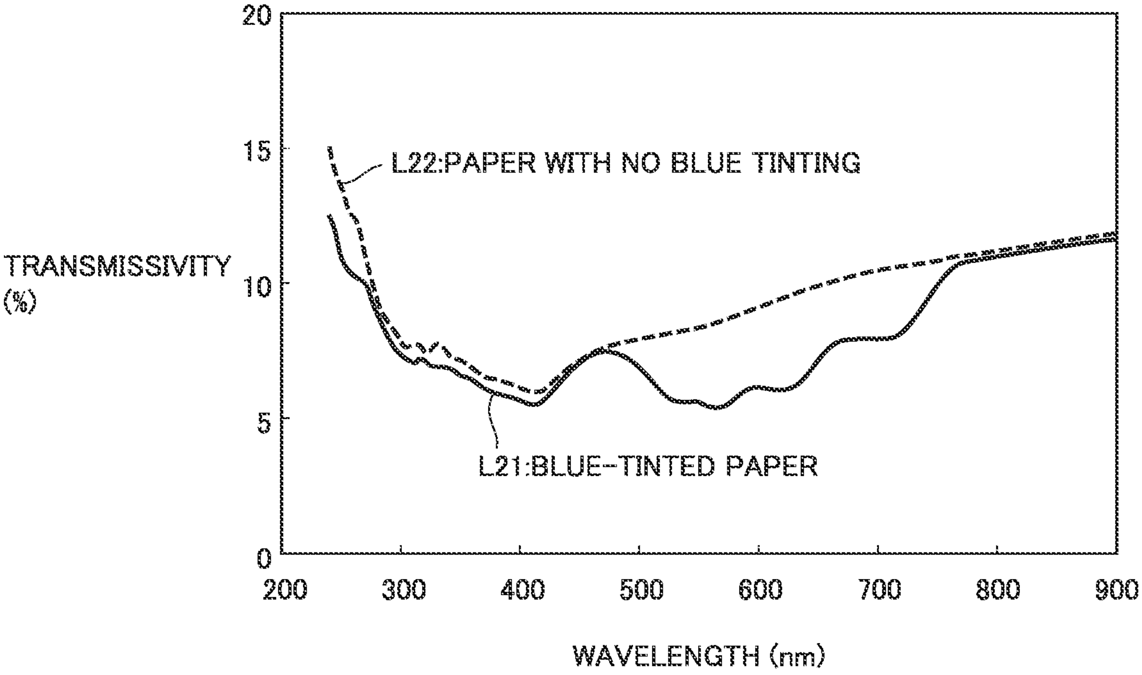
FIG. 7 is a graph drawn to describe how blue tinting affects the optical characteristics of recording materials.

FIG. 7 is a graph drawn to describe how blue tinting affects the optical characteristics of recording materials. FIG. 7 shows the levels of transmissivity of paper at 250 nm to 900 nm. In this graph, a line L21 represents the transmissivity of paper subjected to blue tinting, while a line L22 represents the transmissivity of paper with no blue tinting.

In the example illustrated in FIG. 7, line L21 shows significantly lower values than line L22 at 500 nm to 750 nm. A lower level of transmissivity of a medium means more light absorption by the medium, leading to a lower level of reflectivity of the medium. It is known from FIG. 7 that the blue tinting lowers the reflectivity of the recording material in a wavelength region from green to red.

In terms of the wavelength dependence described earlier, the first wavelength may be selected from wavelengths greater than or equal to 750 nm. The first wavelength may preferably be selected from wavelengths greater than or equal to 800 nm.

The first wavelength may preferably be a wavelength less than or equal to 1100 nm, because of possible effects from water content of the recording material. At wavelengths longer than 1100 nm, the spectrum of reflected light of a recording material (paper) changes with the water content of the recording material. Specifically, the water content has, at 1450 nm and 1940 nm in the near-infrared region, a unique absorption band that originates from the combination vibration of stretching and bending vibrations of oxygen and hydrogen atoms. Thus, the reflectance properties of the recording material may be changeable with the water content of the recording material.

As described thus far, the first wavelength may be a wavelength less than or equal to 1100 nm. The first wavelength may preferably be a wavelength less than or equal to 900 nm.

<Second Wavelength>

As the second wavelength light may be used, for example, light with a wavelength ranging from 400 nm to 500 nm.

The second wavelength may preferably be a wavelength greater than or equal to 400 nm, because of the wavelength region of fluorescent light emission associated with a fluorescent whitening agent added to the recording material (paper).

Figure 8:
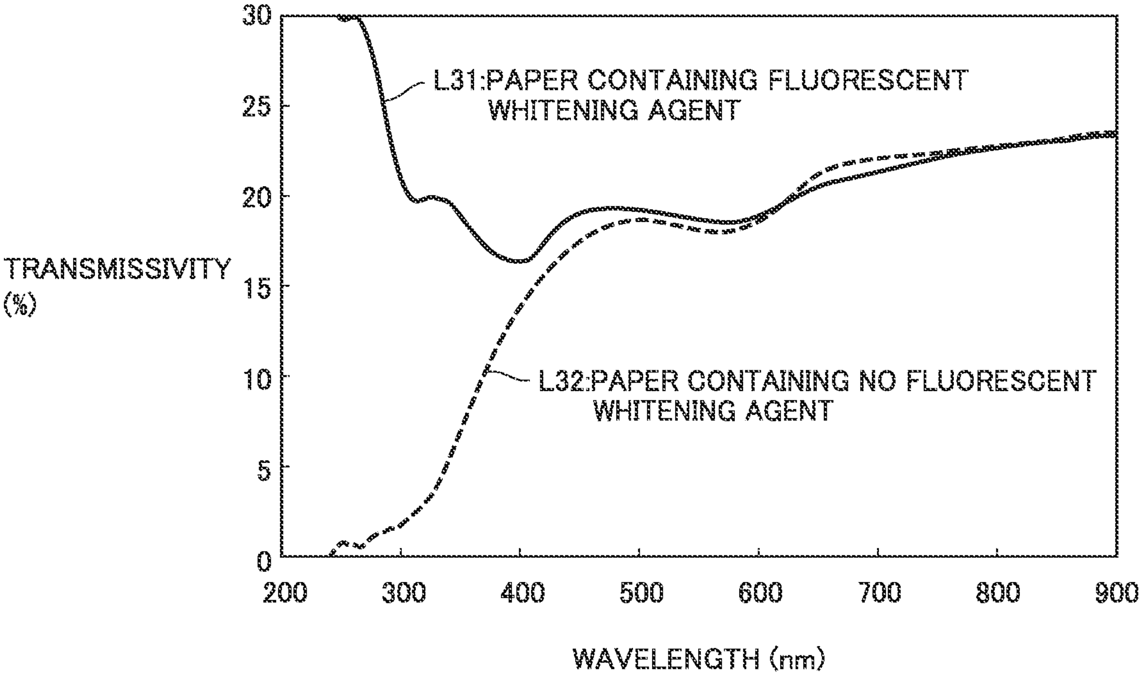
FIG. 8 is a graph drawn to describe how a fluorescent whitening agent affects the optical characteristics of recording materials.

FIG. 8 is a graph drawn to describe how a fluorescent whitening agent affects the optical characteristics of recording materials. FIG. 8 shows the transmissivity of paper at 250 nm to 900 nm. In this graph, a line L31 represents the transmissivity of paper containing a fluorescent whitening agent, while a line L32 represents the transmissivity of paper containing no fluorescent whitening agent.

In the example illustrated in FIG. 8, line L31 shows significantly lower values than line L32 at shorter wavelengths than 400 nm. Such a difference among the values may attribute to fluorescent light emission of the fluorescent whitening agent that occurs at wavelengths shorter than 400 nm.

At wavelengths shorter than 400 nm, the transmitted light of the recording material includes fluorescent light emission resulting from the fluorescent whitening agent.

Thus, the second wavelength may be selected from wavelengths greater than or equal to 400 nm for the wavelength dependence described above. The second wavelength may preferably be selected from wavelengths greater than or equal to 420 nm.

The second wavelength may preferably be a wavelength less than or equal to 500 nm, because of blue tinting of the recording material. As illustrated in FIG. 7, line L21 shows values in a region of wavelengths longer than 500 nm, which are lower than the values of line L22. Thus, the blue tinting lowers the reflectivity of the recording material in a wavelength region from green to red at wavelengths longer than 500 nm.

Thus, the second wavelength may be a wavelength less than or equal to 500 nm. The second wavelength may preferably be a wavelength less than or equal to 480 nm.

[5. Aspect (1): How to Discriminate Among Recording Materials]

Figure 9:
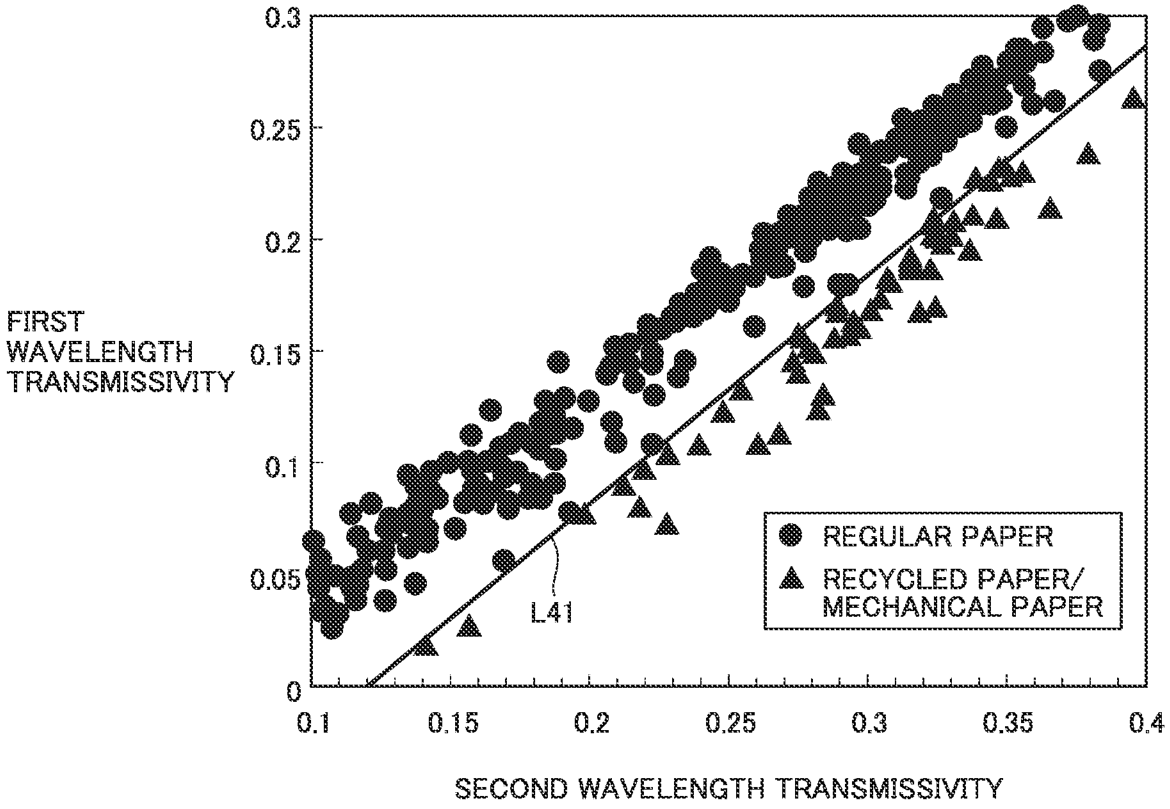
FIG. 9 is a graph drawn to describe an exemplified method for discriminating recording material types using wavelength dependencies of the optical characteristics in regard to first and second wavelengths.

FIG. 9 is a graph drawn to describe an exemplified method for discriminating recording material types using wavelength dependencies of the optical characteristics in regard to first and second wavelengths.

FIG. 9 shows the transmissivity of the first, second wavelength in a plurality of recording materials. In the graph of FIG. 9, the vertical axis represents the transmissivity at the second wavelength, while the horizontal axis represents the transmissivity at the first wavelength.

In the graph of FIG. 9, circles represent values of recording materials classified as regular paper, while triangles represent values of recording materials classified as recycled paper or mechanical paper. In the example of FIG. 9, the values of the regular paper and of the recycled paper or mechanical paper are dividable with a line L41. The values of the recording materials classified as regular paper are on the upper side than line L41, while the values of the recording materials classified as recycled paper or mechanical paper are on the lower side than line L41.

Hence, image forming apparatus 1 may be allowed to derive a discriminating result for types of recording material M by; storing information that identifies line L41 as reference data, detecting the transmissivity at the first, second wavelength in recording material M, arranging coordinates indicating these levels of transmissivity in a graph like the one of FIG. 9, and identifying the position of the coordinates relative to line L41.

To be more specific, the "regular paper" is derived as the discriminating result for types of recording material M when the coordinates are on the upper side than line L41. The "recycled paper or mechanical paper" is derived as the discriminating result for types of recording material M when the coordinates are on the lower side than line L41. Image forming apparatus 1 determines the type of recording material M based on the discriminating result thus derived for recording material M.

As described later with reference to FIGS. 10 and 11, the transmissivity of recording material M may be detectable as the ratio of the quantity of light that transmitted through recording material M to the quantity of light that failed to transmit through recording material M.

The discriminating result based on the positional relationship relative to line L41 in the graph, which was described with reference to FIG. 9, is an exemplified discriminating result obtainable by identifying one of two or more ranges in a diagram including coordinates defined by the first and second detection values of recording material M. In this example, the two or more ranges are dividable with line L41. Line L41 is an exemplified straight line used to divide the diagram into two ranges in accordance with a linear function formula.

To obtain the discriminating result, the graph may be divided with one or more curved lines into two or more ranges. In this instance, information serving to identify one or more curved lines is stored in data storage region 132 as reference data. Then, each of the two or more ranges is associated with one or more recording material types. One of the two or more ranges including the coordinates of recording material M is identified, and the type of the recording material associated with the identified range is derived as the discriminating result for types of recording material M.

The recording material type may be identified based on at least one of a ratio or a difference between the levels of transmissivity of pieces of light with the first and second wavelengths.

In a practical example, a range of ratios indicating regular paper and a range of ratios indicating recycled paper or mechanical paper may be stored as reference data in data storage region 132. Image forming apparatus 1 calculates the ratio between the levels of transmissivity of pieces of light with the first and second wavelengths in recording material M. Then, image forming apparatus 1 derives, as the discriminating result for types of recording material M, the recording material type indicated by the range including the calculated ratio (regular paper, or recycled paper or mechanical paper).

In another practical example, a range of differences indicating regular paper and a range of differences indicating recycled paper or mechanical paper may be stored as reference data in data storage region 132. Image forming apparatus 1 calculates the difference between the levels of transmissivity of pieces of light with the first and second wavelengths in recording material M. Then, image forming apparatus 1 derives, as the discriminating result for types of recording material M, the recording material type indicated by the range including the calculated difference (regular paper, or recycled paper or mechanical paper).

The recording material type may be determined based on a given computation result in which the transmissivity at the first, second wavelength is used. An example of the given computation result may be obtained by, for example, the following formula (1).

$$ax+by=c \quad (1),$$

where x is the transmissivity at the first wavelength, y is the transmissivity at the second wavelength, a and b are predetermined constants, and c is the computation result.

In a practical example, a range of computation results indicating regular paper and a range of computation results indicating recycled paper or mechanical paper may be stored as reference data in data storage region 132. Image forming apparatus 1 calculates the computation result of recording material M from the formula (1) using the transmissivity at the first, second wavelength in recording material M. Then, image forming apparatus 1 derives, as the discriminating result for types of recording material M, the recording material type indicated by the range including the calculated computation result (regular paper, or recycled paper or mechanical paper).

Another example of the given computation result may be obtained by, for example, the following formulas (2) and (3).

$$px+qy=c \ (Tx<x) \quad (2) \text{ and}$$

$$mx+ny=c \ (x \le Tx) \quad (3),$$

where x is the transmissivity at the first wavelength and y is the transmissivity at the second wavelength as in the formula (1), and p, q, m and n are predetermined constants. The formula (2) is used when the value of x is greater than a given threshold (Tx), while the formula (3) is used when the value of x is less than or equal to this threshold. In case the formulas (2) and (3) are used, a formula used to derive the computation result may be selected in accordance with the transmissivity at the first wavelength.

Otherwise, a formula used to derive the computation result in accordance with the value of y may instead be selected, or a formula used to derive the computation result in accordance with the values of x and y may also be an option.

Like the transmissivity, the reflectivity is changeable with absorption characteristics for light absorption in a recording material. Therefore, the reflectivity may be used instead of or in addition to the transmissivity to identify the recording material type.

In a practical example, image forming apparatus 1 defines a graph in which, similarly to line L1 in FIG. 9, the horizontal axis represents the reflectivity at the first wavelength, and the vertical axis represents the reflectivity at the second wavelength. Then, image forming apparatus 1 stores, as reference data, information that identifies a diagram allowed to divide recording materials of different types in this graph (corresponding to line L41 in FIG. 9). Further, image forming apparatus 1 detects the levels of reflectivity of pieces of light with the first and second wavelengths in recording material M. The reflectivity may be, for example, identified as the ratio of the quantity of light reflected from the recording material to the quantity of light output. Image forming apparatus 1 derives the discriminating result for types of recording material M based on a positional relationship between the diagram and coordinates identified based on the reflectivity at the first, second wavelength in recording material M.

[6. Processing Flow]

An exemplified process to discriminate among recording materials is hereinafter described. This process is aimed at identifying recording material types using the transmissivity at the first, second wavelength, as described with reference to FIG. 9.

<Obtaining Reference Quantity of Light>

Figure 10:
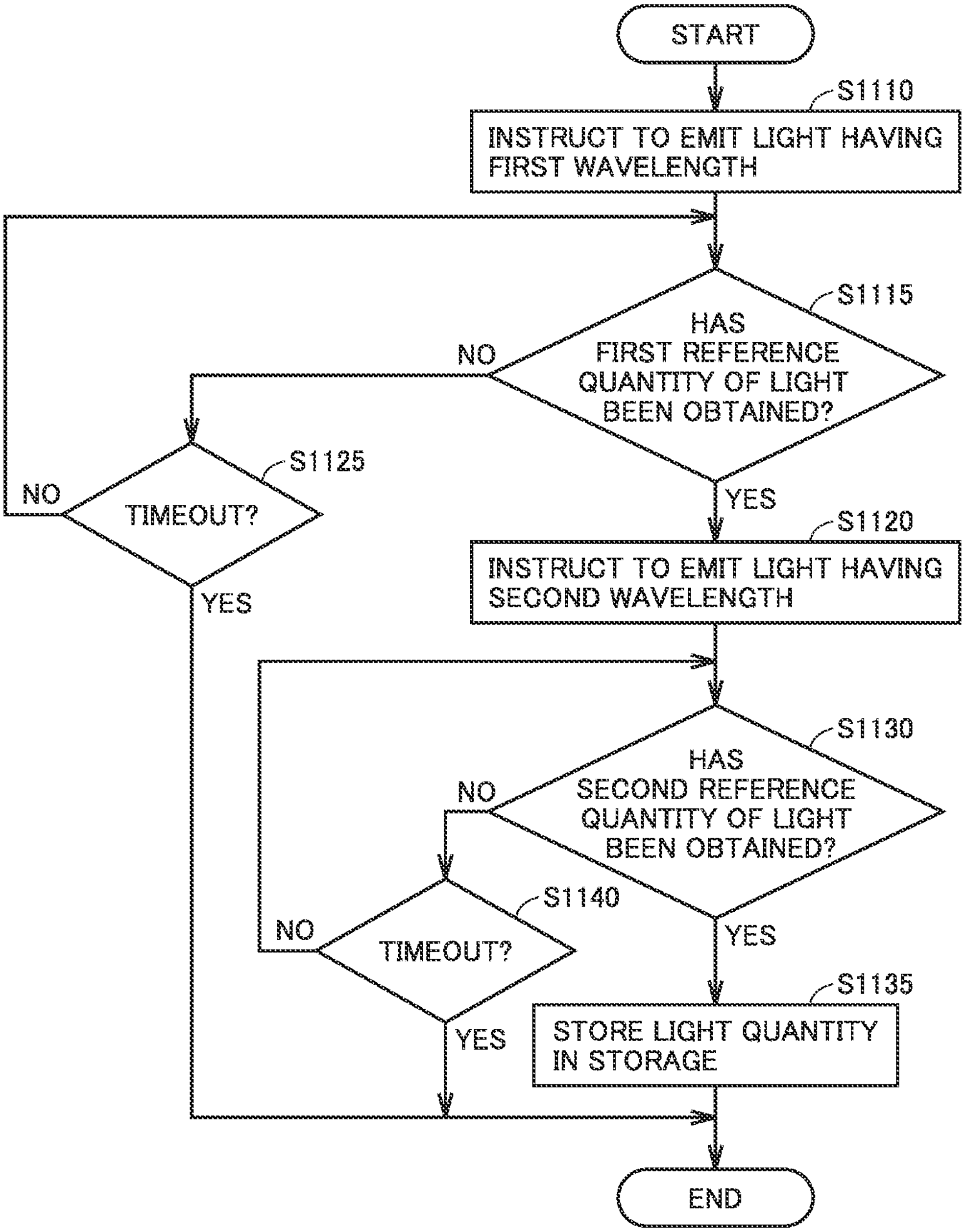
FIG. 10 is a flow chart of a process to obtain a reference quantity of light used to derive the transmissivity of the first and second wavelengths.

FIG. 10 is a flow chart of a process to obtain a reference quantity of light used to derive the transmissivity of the first and second wavelengths. In a practical example, the process illustrated in FIG. 10 are carried in image forming apparatus 1 by having CPU 11 run a predetermined program.

The process illustrated in FIG. 10 may regularly start at certain time intervals, may start when image forming apparatus 1 is turned on, or may start in response to input of a user's instruction.

In step S1110, image forming apparatus 1 outputs an instruction signal to light emitting unit 21Y to prompt this unit to emit illuminating light having the first wavelength. In response to this signal output, first luminous element 211Y outputs the light. The quantity of light to be detected by light receiving element 220 may be referred to as a first reference quantity of light.

In step S1115, image forming apparatus 1 determines whether the first reference quantity of light has been obtained from light detecting unit 22. Whether the first reference quantity of light has been obtained is determined based on information received from light detecting unit 22. Light detecting unit 22 outputs the quantity of light detected by light receiving element 220 to CPU 11. When it is determined that the first reference quantity of light has been obtained from light detecting unit 22 (YES in step S1115), image forming apparatus 1 proceeds to step S1120. Otherwise (NO in step S1115), image forming apparatus 1 proceeds to step S1125.

Step S1115 may determine whether the information received from light detecting unit 22 includes a detection value within a predefined range determined as effective as the first reference quantity of light. In case the information includes any detection value in the range, receipt of the first reference quantity of light is confirmed. Otherwise, receipt of the first reference quantity of light is denied.

In step S1125, image forming apparatus 1 counts, using a timer (not illustrated in the drawings), the passage of time since the result of step S1115 is first obtained and then determines whether timeout occurred based on the counted passage of time. In a practical example, the occurrence of timeout is confirmed when the passage of time equals to a predetermined length of time (for example, one minute). When the occurrence of timeout is confirmed (YES in step S1125), image forming apparatus 1 ends the process illustrated in FIG. 10. Otherwise (NO in step S1125), image forming apparatus 1 returns to step S1115.

In step S1120, image forming apparatus 1 outputs an instruction signal to light emitting unit 21Y to prompt this unit to emit illuminating light having the second wavelength. In response to this signal output, second luminous element 212Y outputs the light. The quantity of light to be detected by light receiving element 220 may be referred to as a second reference quantity of light.

In step S1130, image forming apparatus 1 determines whether the second reference quantity of light has been obtained from light detecting unit 22. Whether the first reference quantity of light has been obtained is determined based on information received from light detecting unit 22. Light detecting unit 22 outputs the quantity of light detected by light receiving element 220 to CPU 11. When it is determined that the second reference quantity of light has been obtained from light detecting unit 22 (YES in step S1130), image forming apparatus 1 proceeds to step S1135. Otherwise (NO in step S1130), image forming apparatus 1 proceeds to step S1140.

Step S1130 may determine whether the information received from light detecting unit 22 includes a detection value within a predefined range determined as effective as the second reference quantity of light. In case the information includes any detection value in the range, receipt of the second reference quantity of light is confirmed. Otherwise, receipt of the second reference quantity of light is denied.

In step S1140, image forming apparatus 1 counts, using a timer (not illustrated in the drawings), the passage of time since the result of step S1130 is first obtained and then determines whether timeout occurred based on the counted passage of time. In a practical example, the occurrence of timeout is confirmed when the passage of time equals to a predetermined length of time (for example, one minute). When the occurrence of timeout is confirmed (YES in step S1140), image forming apparatus 1 ends the process illustrated in FIG. 10. Otherwise (NO in step S1140), image forming apparatus 1 returns to step S1130.

In step S1135, image forming apparatus 1 stores the first reference quantity of light and the second reference quantity of light in data storage region 132. Then, image forming apparatus 1 ends the process of FIG. 10.

<Discriminating Among Recording Material Types>

Figure 11:
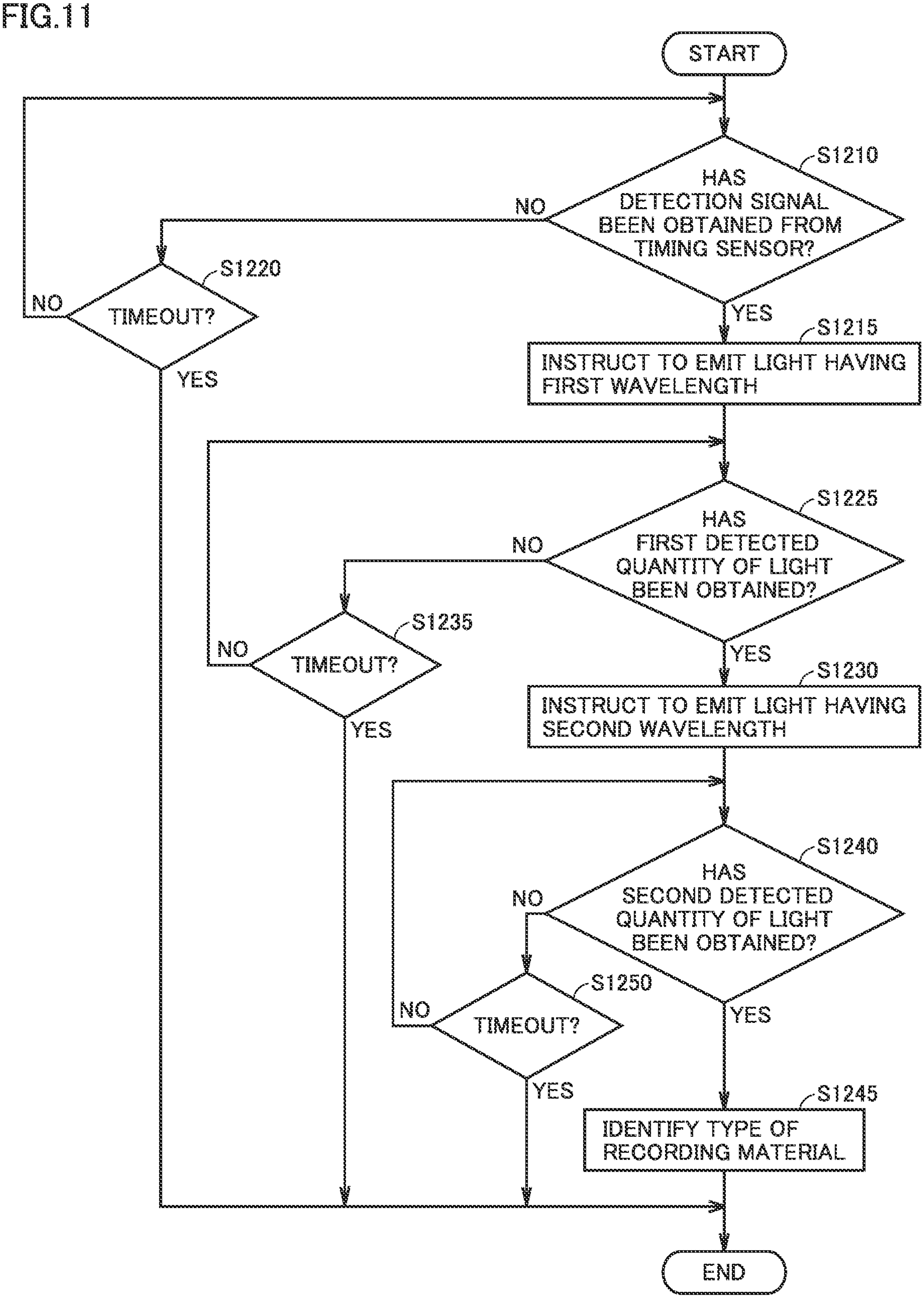
FIG. 11 is a flow chart of a process to discriminate among recording material types.

FIG. 11 is a flow chart of a process to discriminate among recording material types. In a practical example, the processing steps illustrated in FIG. 11 are carried in image forming apparatus 1 by having CPU 11 run a predetermined program.

The process of FIG. 11 may start in response to receipt of a job-start instruction for such jobs as image formation including printing job. The process of FIG. 12 may start in response to input of a user's instruction (may or may not be relevant to image formation-related jobs).

Referring to FIG. 11, image forming apparatus 1, in step S1210, determines whether a detection signal indicating detection of recording material M is received from timing sensor (not illustrated in the drawings). The timing sensor may be located, for example, at a position more upstream than element substrate 23X on the transport path to detect recording material M travelling on the transport path.

When receipt of the detection signal from the timing sensor is confirmed (YES in step S1210), image forming apparatus 1 proceeds to step S1215. Otherwise (NO in step S1210), image forming apparatus 1 proceeds to step S1220.

In step S1220, image forming apparatus 1 determines whether timeout has occurred, failing to obtain the detection signal from the timing sensor. The timeout; failure to receive the detection signal from the timing sensor, occurs in response to the passage of a predetermined length of time since step S1210 first determines whether the detection signal has been received from the timing sensor.

When the occurrence of timeout is confirmed (YES in step S1220), image forming apparatus 1 ends the process of FIG. 11. Otherwise (NO in step S1220), image forming apparatus 1 returns to step S1210.

In step S1215, image forming apparatus 1 outputs an instruction signal to light emitting unit 21Y to prompt this unit to emit illuminating light having the first wavelength. In response to this signal output, first luminous element 211Y outputs the light. The quantity of light to be detected by light receiving element 220 may be referred to as a first detected quantity of light.

In step S1225, image forming apparatus 1 determines whether the first detected quantity of light has been obtained from light detecting unit 22. Whether the first reference quantity of light has been obtained is determined based on information received from light detecting unit 22. Light detecting unit 22 outputs the quantity of light detected by light receiving element 220 to CPU 11. When receipt of the first detected quantity of light from light detecting unit 22 is confirmed (YES in step S1225), image forming apparatus 1 proceeds to step S1230. Otherwise (NO in step S1225), image forming apparatus 1 proceeds to step S1235.

Step S1225 may determine whether the information received from light detecting unit 22 includes a detection value within a predefined range determined as effective as the first detected quantity of light. In case the information includes any detection value in the range, receipt of the first detected quantity of light is confirmed. Otherwise, receipt of the first reference quantity of light is denied.

In step S1235, image forming apparatus 1 determines whether timeout has occurred, failing to obtain the first detected quantity of light. The timeout occurs in response to the passage of a predetermined length of time since the instruction signal output in step S1215. When the occurrence of timeout is determined (YES in step S1235), image forming apparatus 1 ends the process illustrated in FIG. 11. Otherwise (NO in step S1235), image forming apparatus 1 returns to step S1225.

In step S1230, image forming apparatus 1 outputs an instruction signal to light emitting unit 21Y to prompt this unit to emit illuminating light having the second wavelength. In response to this signal output, second luminous element 212Y outputs the light. The quantity of light to be detected by light receiving element 220 may be referred to as a second detected quantity of light.

In step S1240, image forming apparatus 1 determines whether the second detected quantity of light has been obtained from light detecting unit 22. Whether the first reference quantity of light has been obtained is determined based on information received from light detecting unit 22. Light detecting unit 22 outputs the quantity of light detected by light receiving element 220 to CPU 11. When receipt of the second detected quantity of light from light detecting unit 22 is confirmed (YES in step S1240), image forming apparatus 1 proceeds to step S1245. Otherwise (NO in step S1240), image forming apparatus 1 proceeds to step S1250.

In step S1250, image forming apparatus 1 determines whether timeout has occurred, failing to obtain the second detected quantity of light. The timeout occurs in response to the passage of a predetermined length of time since the instruction signal output in step S1230. When the occurrence of timeout is confirmed (YES in step S1250), image forming apparatus 1 ends the process illustrated in FIG. 11. Otherwise (NO in step S1250), image forming apparatus 1 returns to step S1240.

In step S1245, image forming apparatus 1 derives the discriminating result for types of recording material M. To be more specific, image forming apparatus 1 derives the transmissivity of light having the first wavelength from the first reference quantity of light and the first detected quantity of light, the transmissivity of light having the second wavelength from the second reference quantity of light and the second detected quantity of light, and determines whether coordinates identified based on the transmissivity at the first wavelength and the transmissivity at the second wavelength are on the upper or lower side than line L41 in FIG. 9. Thus, image forming apparatus 1 derives a discriminating result for material types and then identifies a type indicated by the discriminating result as the type of recording material M. The type indicated by the discriminating result is "regular paper" in case the coordinates are on the upper side than line L41. The type indicated by the discriminating result is, on the other hand, "recycled paper or mechanical paper" in case the coordinates are on the lower side than line L41.

In the processes described thus far with reference to FIGS. 10 and 11, the detection result based on absorptions of pieces of light with two different wavelengths in recording material M are used to derive the type of recording material M2. In a practical example, the discriminating result for paper types according to the aspect (1) is used to discriminate among the paper types including regular paper, recycled paper and mechanical paper.

[7. Aspect (2): How to Discriminate Among Recording Materials]

Figure 12:
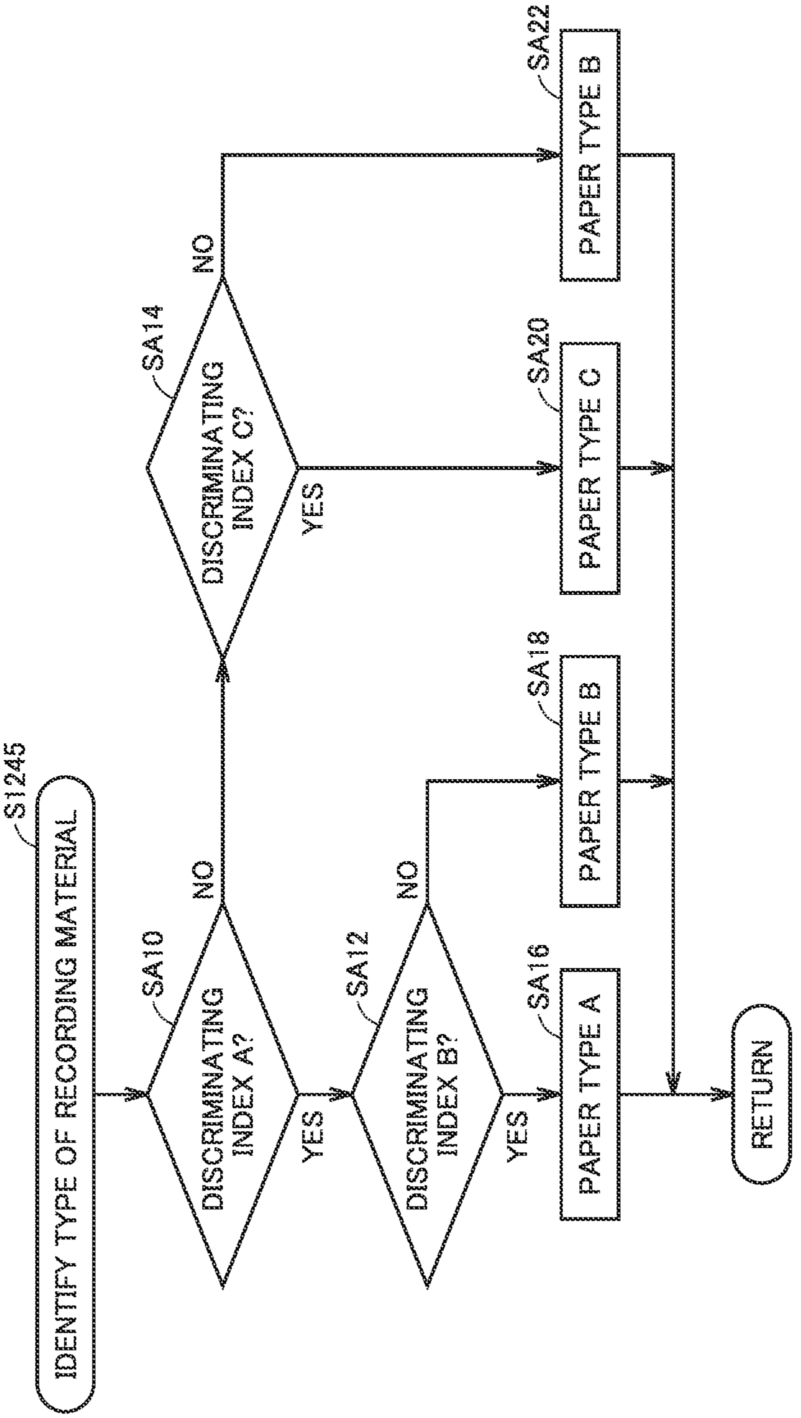
FIG. 12 is a flow chart of another process to discriminate among recording materials.

FIG. 12 is a flow chart of another process to discriminate among recording materials. In FIG. 12 is illustrated a modified example of the discriminating method for types of recording material M in step S1245 of FIG. 11. The flow chart of FIG. 12 is an exemplified subroutine of step S1245, in which a discriminating result for types of recording material M is derived provided that a detection result based on light absorption in recording material M satisfies two or more conditions. In FIG. 12, three discriminating indexes corresponding to three conditions are schematically illustrated as discriminating indexes A to C.

To be more specific, in step SA10, image forming apparatus 1 determines whether the detection result satisfies discriminating index A, and proceeds to step SA12 when the detection result satisfies this index (YES in step SA10), while proceeding to step SA14 otherwise (NO in step SA10).

In step SA12, image forming apparatus 1 determines whether the detection result satisfies discriminating index B, and proceeds to step SA16 when the detection result satisfies this index (YES in step SA12), while proceeding to step SA18 otherwise (NO in step SA12).

In step SA14, image forming apparatus 1 determines whether the detection result satisfies discriminating index C, and proceeds to step SA20 when the detection result satisfies this index (YES in step SA14), while proceeding to step SA22 otherwise (NO in step SA14).

In step SA16, image forming apparatus 1 derives a paper type A as the type of recording material M, and then returns to the process of FIG. 11. In steps SA18 and SA22, image forming apparatus 1 derives a paper type B as the type of recording material M, and then returns to the process of FIG. 11. In step SA20, image forming apparatus 1 derives a paper type C as the type of recording material M, and then returns to the process of FIG. 11.

FIG. 13 is a table showing a relationship between discriminating indexes and discriminating results in the process of FIG. 12. FIG. 13 shows results for discriminating indexes A to C (YES or NO) required to derive three different discriminating results (paper types A to C) as the type of recording material M. In FIG. 13, a condition required to derive "paper type A", for example, is checked.

As described referring to FIG. 12, discriminating indexes A and B need to be both determined as "YES" for "paper type A". Step SA14 may be unnecessary for "paper type A" because "YES" to discriminating index A is a requirement for "paper type A". For "paper type A", discriminating index C may take either one of "YES" or "NO". Of eight rows in the table of FIG. 13, this description to "paper type A" is shown in the second row from the top. With "YES" for both of discriminating indexes A and B, discriminating index C may take either one of "YES" (first row) or "NO" (second row) for "paper type A".

In the example described with reference to FIGS. 12 and 13, at least two conditions are required to derive each of the discriminating results for paper types A to C. Two conditions for paper type A in one instance are; 1) "YES" for discriminating index A, and 2) "YES" for discriminating index B.

Two conditions for paper type B in one instance are; 1) "YES" for discriminating index A, and 2) "NO" for discriminating index B.

Two conditions for paper type B in another instance are; 1) "NO" for discriminating index A, and 2) "NO" for discriminating index C.

Two conditions for paper type C in one instance are; 1) "NO" for discriminating index A, and 2) "YES" for discriminating index C.

<Aspect (2): Effects>

Figure 14:
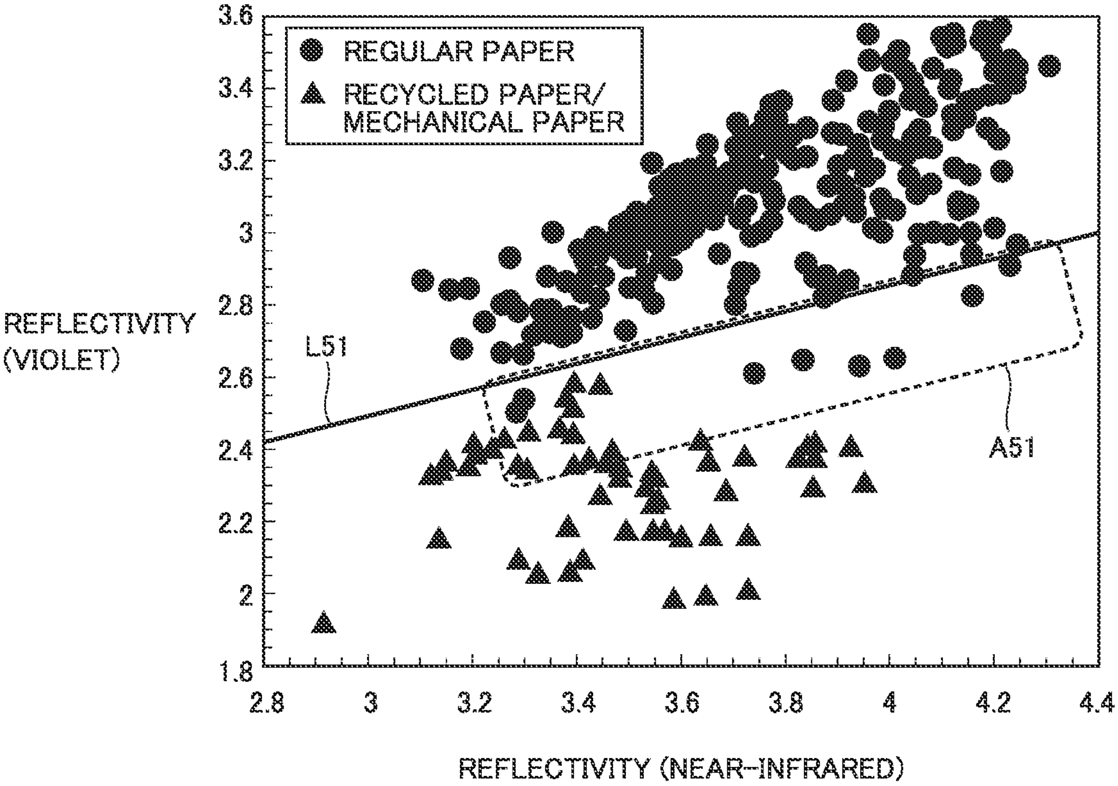
FIG. 14 is a graph showing a relationship between two different levels of reflectivity in recording materials.
Figure 15:
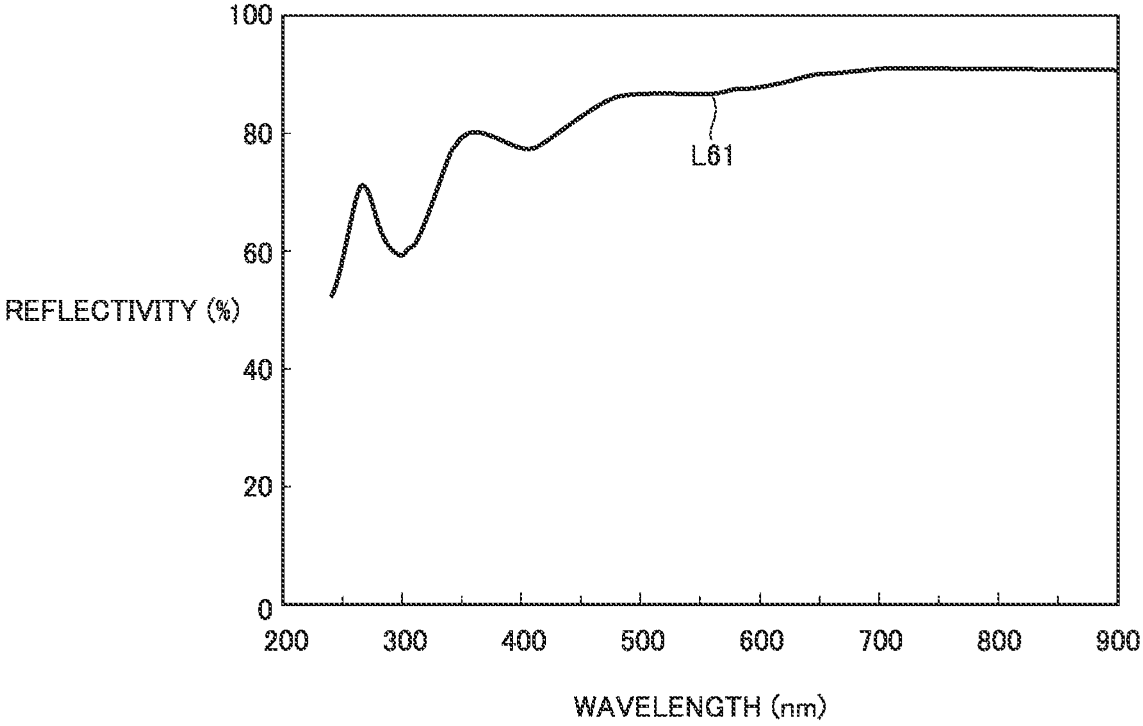
FIG. 15 is a graph showing the reflectivity of a type of regular paper.

With reference to FIGS. 14 and 15, effects of using two or more conditions to derive the discriminating result for one recording material type are hereinafter described. FIG. 14 is a graph showing a relationship between two different levels of reflectivity in recording materials. In the graph of FIG. 14, the vertical axis "reflectivity (violet)" represents the reflectivity of violet light (center wavelength: 390 to 420 nm). The horizontal axis "reflectivity (near-infrared)" represents the reflectivity of near-infrared light (center wavelength: 750 to 1100 nm).

In FIG. 14, values of regular paper are illustrated with circles, and values of recycled paper or mechanical paper are illustrated with triangles. In the graph of FIG. 14, "regular paper" and "recycled paper or mechanical paper" are roughly distinguishable with a line L51. The values of regular paper are mostly on the upper side than line L51 but are only partly on the lower side than line L51, as in a frame A51. In the example of FIG. 14, line L51 fails to completely separate the values of "regular paper" from the values of "recycled paper or mechanical paper".

In the example of FIG. 14, therefore, one given condition alone fails to determine whether the type of a target recording material is "regular paper" or "recycled paper or mechanical paper". One reason for that is a pigment(s) added to a particular type(s) of regular paper. Referring to FIG. 15, this issue is described below.

FIG. 15 is a graph showing the reflectivity of a type of regular paper. In a practical example, this regular paper may be ivory-colored paper. In the graph of FIG. 15, the vertical axis represents the reflectivity, while the horizontal axis represents the wavelength.

An ivory-based pigment is added to this regular paper in view of design. This pigment absorbs abundant light at wavelengths near 400 nm, as illustrated with a line L61 in FIG. 15. The reflectivity of the pigment-added regular paper at wavelengths near 400 nm is often lower than that of regular paper containing no pigment. Thus, the reflectivity of violet light of the pigment-containing regular paper is adversely affected by the pigment, and the behavior of violet light reflection in the pigment-containing regular paper may be similar to the behavior of violet light reflection in recycled paper or mechanical paper.

In the aspect (2), the type of a target recording material is derived when the detection result satisfies two or more conditions. The light absorption behavior of the recording material may be affected by various events including a pigment(s) as described earlier. Yet, the aspect (2) may allow the recording material type to be accurately identified.

The aspect (2) may use light with a broader wavelength range than in the aspect (1). Specific examples of the pieces of light having two or more wavelengths may include the following five different types of light; violet light with a wavelength ranging from 390 nm to 420 nm, blue 1 light with a wavelength ranging from 420 nm to 500 nm, green light with a wavelength ranging from 500 nm to 600 nm, red light with a wavelength ranging from 600 nm to 700 nm, and near-infrared light with a wavelength ranging from 750 nm to 1100 nm. In the graphs illustrated in FIG. 18 and the drawings that follow, pieces of light mentioned below are used as examples of the pieces of light with different colors, violet light: light with the wavelength of 405 nm, blue light: light with the wavelength of 460 nm, green light: light with the wavelength of 530 nm, red light: light with the wavelength of 670 nm, and near-infrared light: light with the wavelength of 940 nm.

<Aspect (2): First Example>

Figure 16:
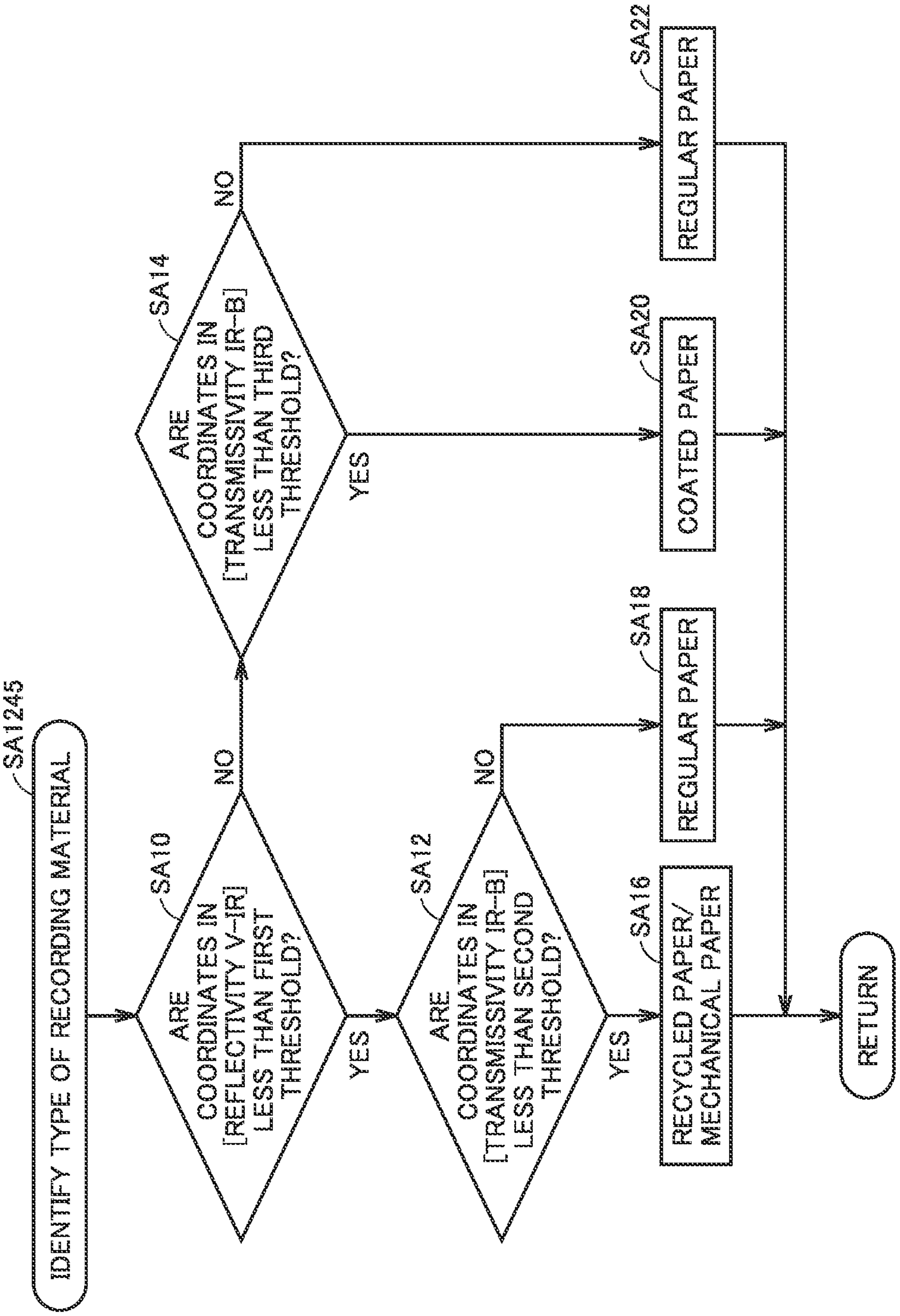
FIG. 16 is a flow chart of processing steps in a discriminating method for types of the recording materials M.

FIG. 16 is a flow chart of processing steps in a discriminating method for types of the recording materials M. The process illustrated in FIG. 16 shows specific steps of the discriminating method for types of recording material M in step S1245 of FIG. 11. While the process illustrated in FIG. 11 used the levels of transmissivity of pieces of light with two different wavelengths in target recording material M, the process of FIG. 16 does not necessarily limit the wavelengths to two wavelengths. In the process illustrated in FIG. 16, the value calculated using the "detection value based on light absorption in the recording material" may be either one of the reflectivity or transmissivity, or both of the reflectivity and transmissivity.

The process illustrated in FIG. 16 shows specific steps of the process illustrated in FIG. 12. In the process of FIG. 16, discriminating indexes A to C illustrated in FIG. 12 may defined as follows. The coordinates described herein indicate coordinates expressed in each graph using values obtained for target recording material M.

Discriminating index A (step SA10): coordinates in [reflectivity V-IR] are less than a first threshold.

Discriminating index B (step SA12): coordinates in [transmissivity IR-B] are less than a second threshold.

Discriminating index C (step SA14): coordinates in [transmissivity IR-B] are less than a third threshold.

In the process of FIG. 16, paper types A to C illustrated in FIG. 12 may defined as follows.

Paper type A: recycled paper or mechanical paper

Paper type B: regular paper

Paper type C: coated paper

The coated paper refers to papers coated with various materials for printing use. An example of the coated paper is a quality paper coated with approximately 20 to 40 g/m$^2$ of a coating material which is a mixture of an adhesive like starch and a white pigment containing kaolin or calcium carbonate.

FIG. 17 is a table showing a relationship between discriminating indexes and discriminating results in the process of FIG. 16. As with the flow chart of FIG. 16, FIG. 17 shows specific examples of paper types A to C and discriminating indexes A to C of FIG. 13.

Figure 18:
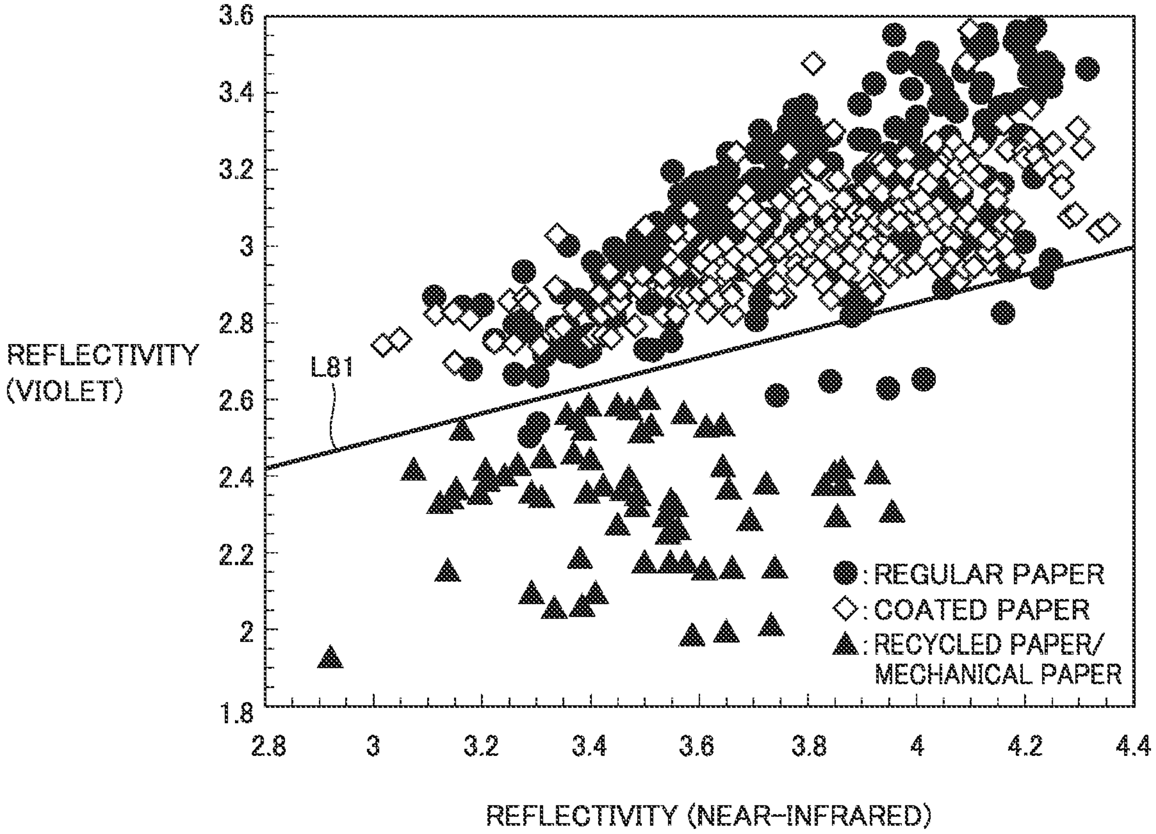
FIG. 18 is a graph drawn to describe details relevant to a discriminating index A (step SA10) in FIG. 17.

FIG. 18 is a graph drawn to describe details relevant to a discriminating index A (step SA10) in FIG. 17. FIG. 18 shows a graph of "reflectivity V-IR" in reference to discriminating index A.

In the graph of FIG. 18, the vertical axis "reflectivity (violet)" represents the reflectivity of violet light in the recording materials. The horizontal axis "reflectivity (near-infrared)" represents the reflectivity of near-infrared light in the recording materials. In the graph of FIG. 18 are shown values of recording materials of three different types; regular paper (circle), coated paper (rhombus) and recycled paper or mechanical paper (triangle).

A line L81 illustrated in FIG. 18 is a preset straight line that separates the coated paper from the other types of paper. Information serving to identify line L81 is stored in data storage region 132 as reference data. Line L81 presents a set of first thresholds. To determine whether the coordinates of target recording material M are less than the first threshold in step SA10 is to determine whether the coordinates of target recording material M are on the lower side than line L81 in the graph of FIG. 18. The lower side than L81 indicates that the "reflectivity (violet)" has a value less than the first threshold.

Figure 19:
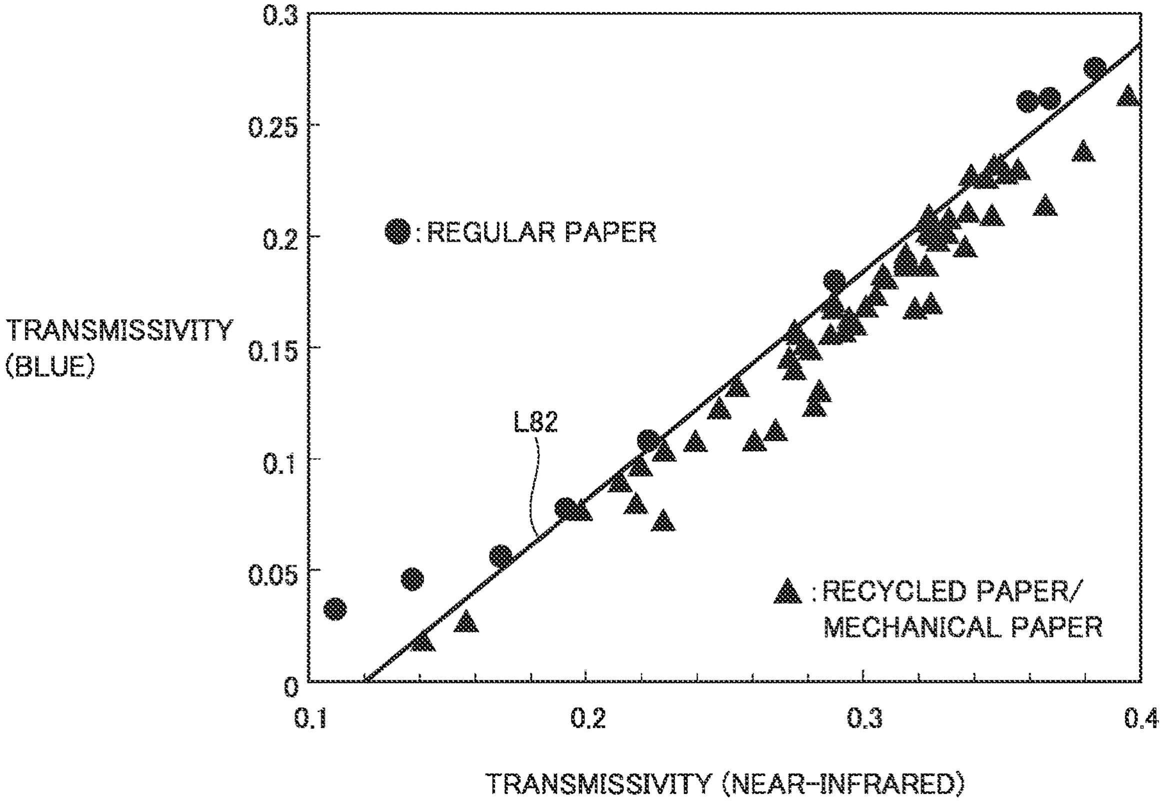
FIG. 19 is a graph drawn to describe details relevant to a discriminating index B (step SA12) in FIG. 17.

FIG. 19 is a graph drawn to describe details relevant to a discriminating index B (step SA12) in FIG. 17 FIG. 19 shows a graph of "transmissivity IR-B" in reference to discriminating index B.

In the graph of FIG. 19, the vertical axis "transmissivity (blue)" represents the transmissivity of blue light in the recording materials. The horizontal axis "transmissivity (near-infrared)" represents the transmissivity of near-infrared light in the recording materials. In the graph of FIG. 19 are shown values of recording materials of two different types; regular paper (circle) and recycled paper or mechanical paper (triangle).

A line L82 illustrated in FIG. 19 is a preset straight line that separates the regular paper from the recycled paper or mechanical paper. Information serving to identify line L82 is stored in data storage region 132 as reference data. Line L82 presents a set of second thresholds. To determine whether the coordinates of target recording material M are less than the second threshold in step SA12 is to determine whether the coordinates of target recording material M are on the lower side than line L82 in the graph of FIG. 19. The lower side than L82 indicates that the "transmissivity (blue) "has a value less than second threshold.

Figure 20:
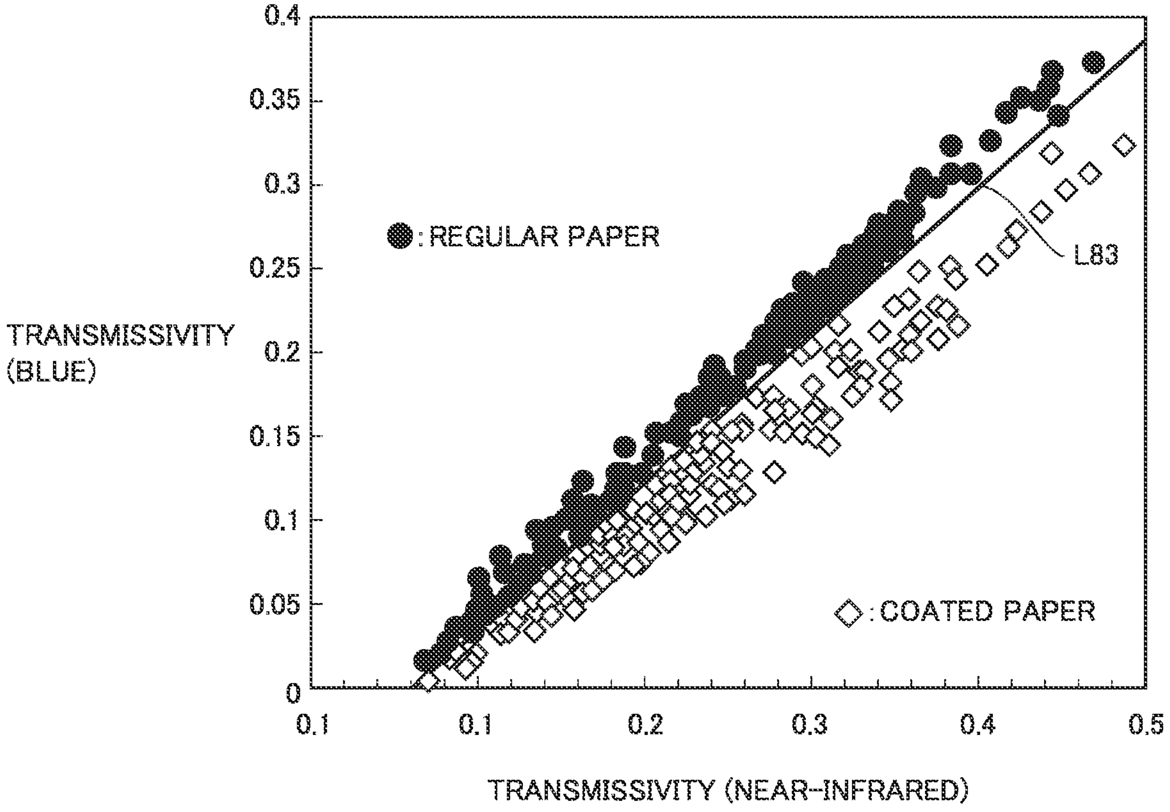
FIG. 20 is a graph drawn to describe details relevant to a discriminating index C (step SA14) in FIG. 17.

FIG. 20 is a graph drawn to describe details relevant to a discriminating index C (step SA14) in FIG. 17. FIG. 20 shows a graph of "transmissivity IR-B" in reference to discriminating index C.

In the graph of FIG. 20, the vertical axis "transmissivity (blue)" represents the transmissivity of blue light in the recording materials. The horizontal axis "transmissivity (near-infrared)" represents the transmissivity of near-infrared light in the recording materials. In the graph of FIG. 20 are shown values of recording materials of two different types; regular paper (circle) and coated paper (rhombus).

A line L83 illustrated in FIG. 20 is a preset straight line that separates the regular paper from the coated paper. Information serving to identify line L83 is stored in data storage region 132 as reference data. Line L83 presents a set of third thresholds. To determine whether the coordinates of target recording material M are less than the third threshold in step SA14 is to determine whether the coordinates of target recording material M are on the lower side than line L83 in the graph of FIG. 20. The lower side than L83 indicates that the "transmissivity (blue)" has a value less than third threshold. In a practical example, whether the recording medium is regular paper, or recycled paper or mechanical paper is at least determined based on the discriminating result for paper types according to the specific example of the aspect (2).

<Aspect (2): Second Example>

Figure 21:
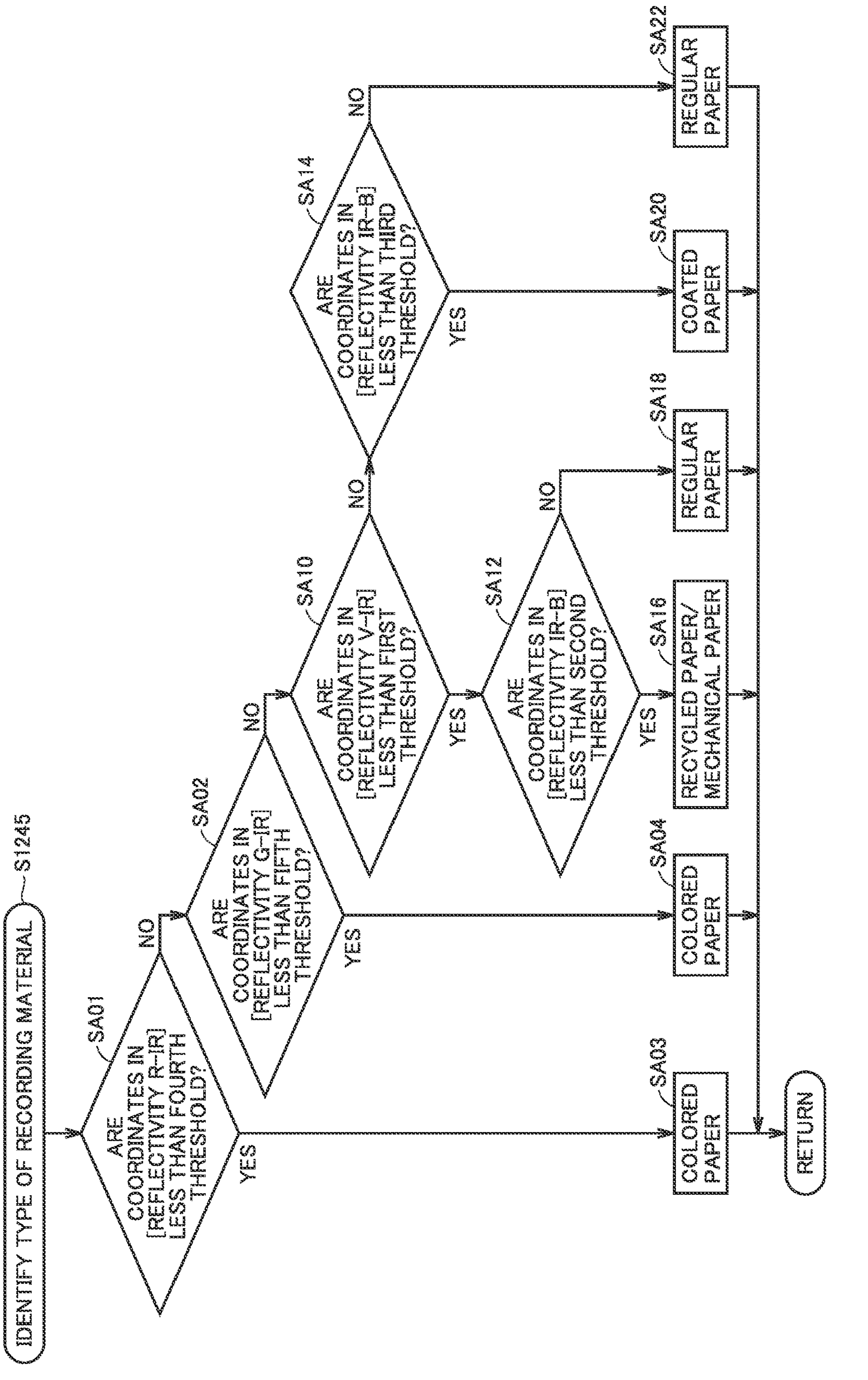
FIG. 21 is a flow chart of processing steps in another discriminating method for types of the recording materials M.

FIG. 21 is a flow chart of processing steps in another discriminating method for types of the recording materials M. In the process illustrated in FIG. 21, steps SA01 to SA04 are added as preceding steps to the process of FIG. 16. In the process of FIG. 21, "colored paper" is further included in the recording materials derivable as the discriminating result. The "colored paper" refers to paper to which a dye(s) is added by a ratio greater than or equal to a given percentage.

In step SA01, image forming apparatus 1 determines whether the coordinates obtained from the detection result of target recording material M are less than the fourth threshold in the graph "reflectivity R-IR". Image forming apparatus 1 proceeds to step SA03 when the coordinates are less than the fourth threshold (YES in step SA01), while proceeding to step SA02 otherwise (NO in step SA01).

In step SA02, image forming apparatus 1 determines whether the coordinates from the detection result of target recording material M are less than a fifth threshold in a graph "reflectivity G-IR". Image forming apparatus 1 proceeds to step SA04 when the coordinates are less than the fifth threshold (YES in step SA02), while proceeding to step SA10 otherwise (NO in step SA02).

In steps SA03 and SA04, image forming apparatus 1 derives the "colored paper" as the discriminating result for recording material M type, and then returns to the process of FIG. 10.

FIG. 22 is a table showing a relationship between discriminating indexes and discriminating results in the process of FIG. 21. In FIG. 21, "-" indicates that whether YES or NO is not questioned for the discriminating result using any relevant discriminating index.

Referring to the first row in FIG. 22, YES in step SA01 automatically derives the "colored paper" as the discriminating result regardless of whether the other four discriminating results (obtained in steps SA02, SA10, SA20, SA30) take YES or NO.

Referring to the second row in FIG. 22, the "colored paper" is derived as the discriminating result with NO in step SA01 and YES in step SA02 regardless of whether the other three discriminating results (obtained in steps SA10, SA20, SA30) take YES or NO.

Figure 23:
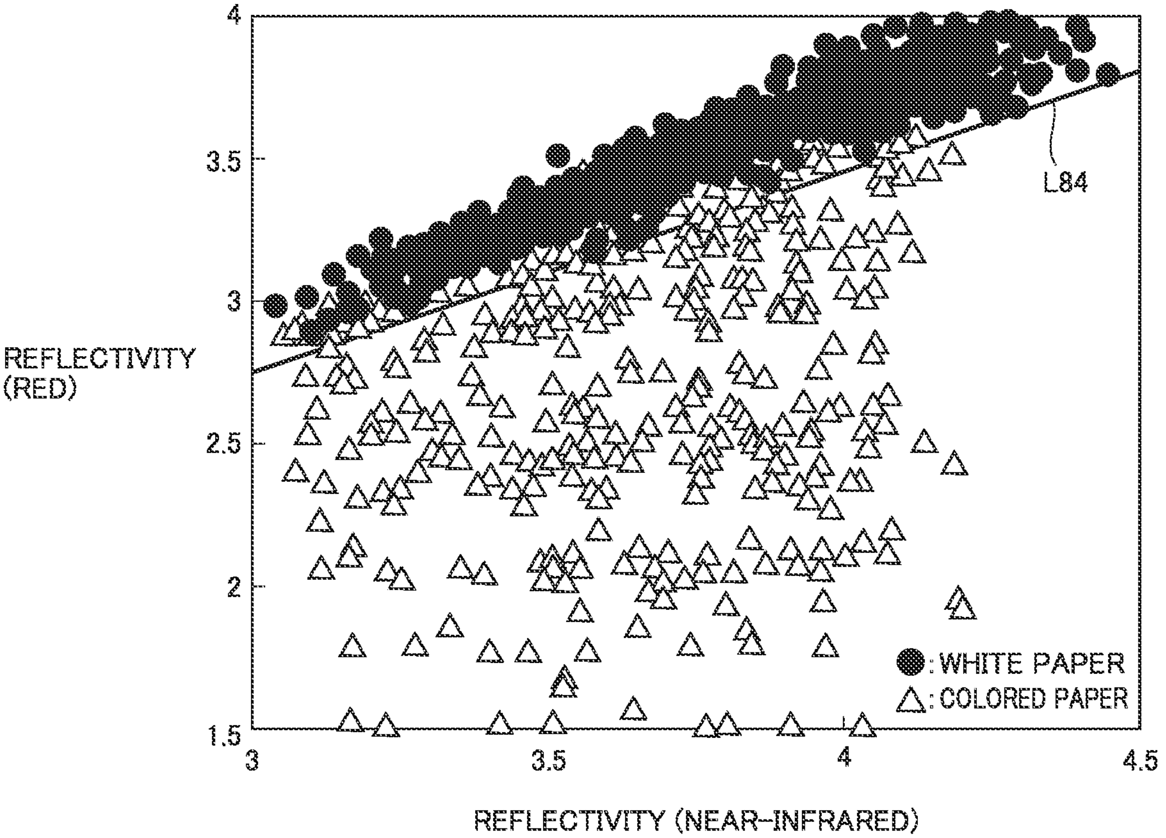
FIG. 23 is a graph drawn to describe step SA01.

FIG. 23 is a graph drawn to describe a step SA01. The graph illustrated in FIG. 23 is a graph of "reflectivity R-IR".

In the graph of FIG. 23, the vertical axis "reflectivity (red)" represents the reflectivity of red light in the recording materials. The horizontal axis "reflectivity (near-infrared)" represents the reflectivity of near-infrared light in the recording materials. In the graph of FIG. 23 are shown values of recording materials of two different types; white paper (circle) and colored paper (triangle). The "white paper" refers to regular paper to which a dye(s) is added by less than a predetermined ratio.

A line L84 illustrated in FIG. 23 is a preset straight line that separates the white paper from the colored paper. Information serving to identify line L84 is stored in data storage region 132 as reference data. Line L84 presents a set of fourth thresholds. To determine whether the coordinates of target recording material M are less than the fourth threshold in step SA01 is to determine whether the coordinates of target recording material M are on the lower side than line L84 in the graph of FIG. 23. The lower side than L84 indicates that the "reflectivity (red)" has a value less than the fourth threshold.

Figure 24:
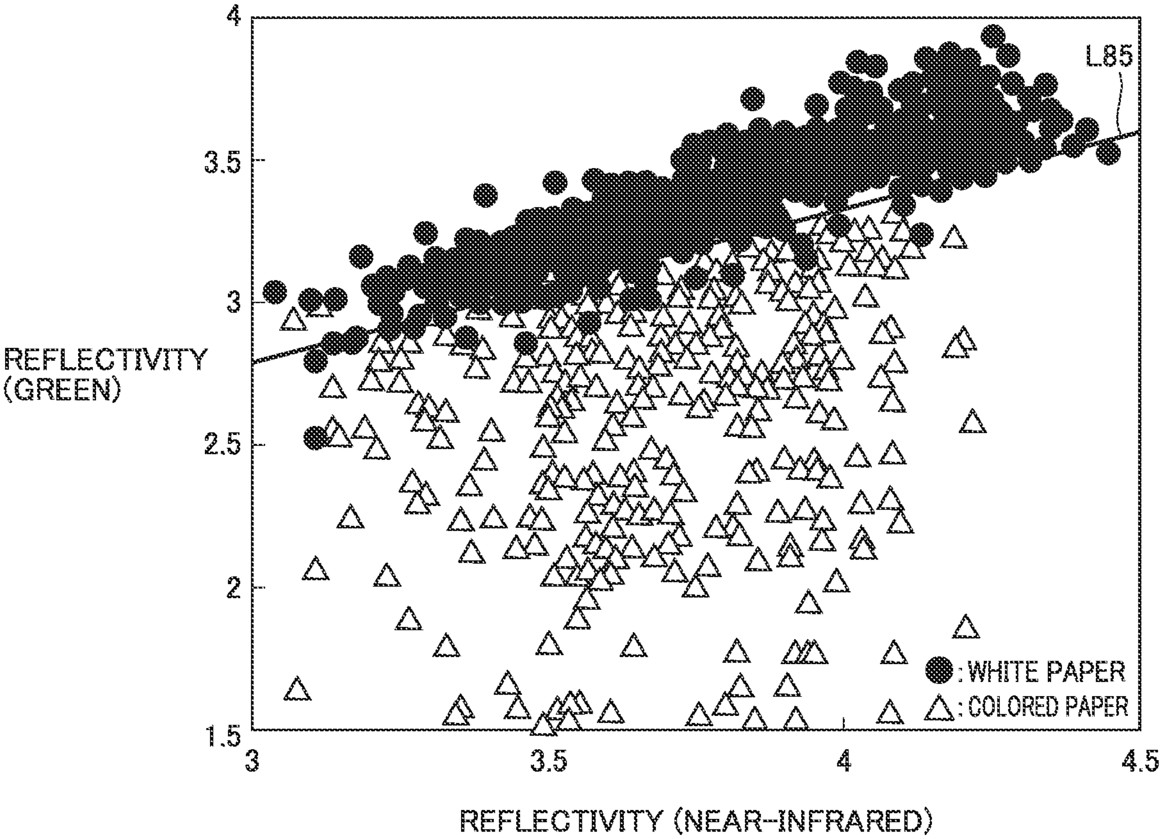
FIG. 24 is a graph drawn to describe step SA02.

FIG. 24 is a graph drawn to describe a step SA02. The graph illustrated in FIG. 24 is a graph of "reflectivity G-IR".

In the graph of FIG. 24, the vertical axis "reflectivity (given)" represents the reflectivity of green light in the recording materials. The horizontal axis "reflectivity (near-infrared)" represents the reflectivity of near-infrared light in the recording materials. In the graph of FIG. 24 are shown values of recording materials of two different types; white paper (circle) and colored paper (triangle). The "white paper" refers to regular paper to which a dye(s) is added by less than a predetermined ratio.

A line L85 illustrated in FIG. 24 is a preset straight line that separates the white paper from the colored paper. Information serving to identify line L85 is stored in data storage region 132 as reference data. Line L85 presents a set of fifth thresholds. To determine whether the coordinates of target recording material M are less than the fifth threshold in step SA02 is to determine whether the coordinates of target recording material M are on the lower side than line L85 in the graph of FIG. 24. The lower side than L85 indicates that the "reflectivity (green)" has a value less than the fifth threshold.

[8. Light Receiving Element]

Figure 25:
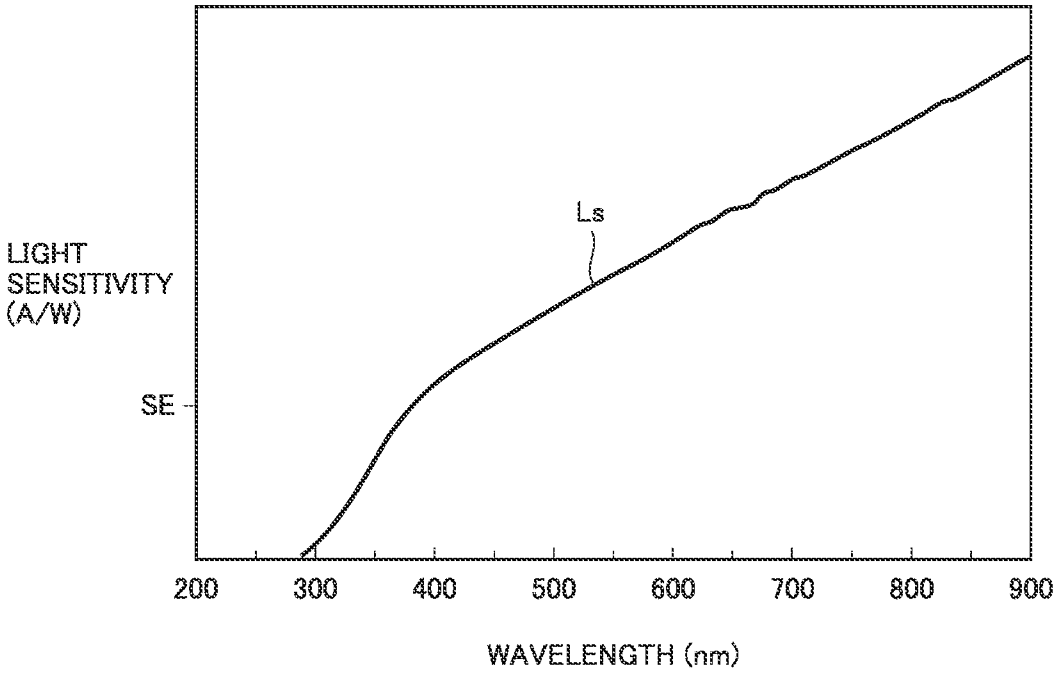
FIG. 25 is a graph showing changes of light sensitivity of a light receiving element 220 with wavelengths.

FIG. 25 is a graph showing changes of light sensitivity of a light receiving element 220 with wavelengths. In FIG. 25, a line Ls represents the light sensitivity of light receiving element 220 with different wavelengths.

In the example illustrated in FIG. 25, the light sensitivity of light receiving element 220 reaches a predetermined value (SE (A/W) at 390 nm and shows a greater value with a longer wavelength. The predetermined value is set beforehand as a required sensitivity used to discriminate among the recording material types.

As described earlier, the aspect (1) uses the detection results at wavelengths in a range of 400 nm to 500 nm and in a range of 750 nm to 1100 nm. In the aspect (2), the detection results for wavelengths in a range of 390 nm to 1100 nm are used. Light receiving element 220 used in the aspect (1) for the recording materials may be selected from photodiodes and phototransistors having levels of detection sensitivity greater than or equal to the before-mentioned predetermined value at wavelengths ranging from 400 nm to 500 nm and ranging from 750 nm to 1100 nm. Light receiving element 220 used in the aspect (2) for the recording materials may be selected from photodiodes and phototransistors having levels of detection sensitivity greater than or equal to the before-mentioned predetermined value at wavelengths ranging from 390 nm to 1100 nm.

[9. Obtaining Light Detection Results at a Plurality of Wavelengths]

In a practical example, light receiving element 220 obtains the quantities of light with different wavelengths and at different timings, as described with reference to FIGS. 10 and 11. In the process of FIG. 11, light receiving element 220 obtains the quantity of light having the first wavelength in step S1225, while obtaining the quantity of light having the second wavelength in step S1240. Light receiving element 220 is an exemplified light receiving element that obtains detection results based on absorptions of pieces of light having two or more wavelengths emitted from the light source unit at timings corresponding to the respective pieces of light having two or more wavelengths.

Figure 26:
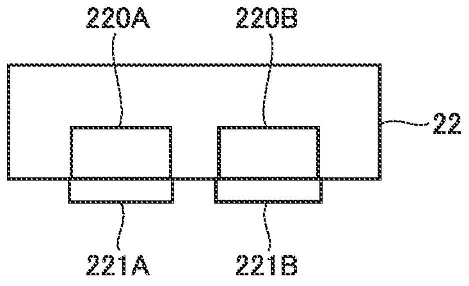
FIG. 26 is a drawing that illustrates a modified example of a light detecting unit 22.

Light detecting unit 22 may be adapted to obtain at the same time the quantities of pieces of light with different wavelengths. FIG. 26 is a drawing that illustrates a modified example of a light detecting unit 22.

In FIG. 26, light detecting unit 22 includes a first light receiving element 220A and a second light receiving element 220B. First light receiving element 220A is mounted with a first filter 221A. Second light receiving element 220B is mounted with a second filter 221B.

First filter 221A and second filter 221B respectively have transmission properties that differ from each other. To be specific, the level of transmissivity of first filter 221A for the first wavelength is higher than in any other wavelength regions. The level of transmissivity of second filter 221B for the second wavelength is higher than in any other wavelength regions.

Light detecting unit 22 configured as illustrated in FIG. 26 may be allowed to obtain, at a certain timing, transmitted light (or reflected light) with the first wavelength using first light receiving element 220A based on light that transmitted through recording material M (or light reflected from recording material M). Likewise, light detecting unit 22 may be allowed to obtain, at a certain timing, transmitted light (or reflected light) with the second wavelength using second light receiving element 220B. This may reduce time required to identify the recording material type.

An aspect of this disclosure may successfully discriminate among different types of paper with a higher accuracy by suitably selecting one of the first wavelength and the second wavelength to derive the discriminating result for paper types. Another aspect of this disclosure may successfully discriminate among different types of paper with a higher accuracy by using two or more conditions to derive the discriminating result for paper types.

Although embodiments of the present invention have been described and illustrated in detail, the disclosed embodiments are made for purposes of illustration and example only and not limitation. The scope of the present invention should be interpreted by terms of the appended claims.

What is claimed is:

1. A paper discriminating device, comprising:

a light source unit that emits pieces of light having two or more wavelengths onto paper; and a detecting unit that obtains a detection result based on absorption by the paper of each of the pieces of light having two or more wavelengths, the pieces of light having two or more wavelengths including light having a first wavelength and light having a second wavelength, the detection result including a first detection value based on absorption by the paper of the light having the first wavelength, and a second detection value based on absorption by the paper of the light having the second wavelength, the paper discriminating device further comprising a control unit that derives a discriminating result for types of the paper using the first and second detection values, the first wavelength being a wavelength in a range of 750 nm to 1100 nm, and the second wavelength being a wavelength in a range of 400 nm to 500 nm, wherein using the first and second detection values includes calculating, from the first detection value, a first transmissivity which is transmissivity of the light having the first wavelength in the paper;

calculating, from the second detection value, a second transmissivity which is transmissivity of the light having the second wavelength in the paper; and calculating at least one of a ratio or a difference between the first transmissivity and the second transmissivity.

2. The paper discriminating device according to claim 1, wherein the first detection value includes a quantity of transmitted light of the light having the first wavelength transmitting through the paper, and the second detection value includes a quantity of transmitted light of the light having the second wavelength transmitting through the paper.

3. The paper discriminating device according to claim 1, wherein using the first and second detection values includes deriving a predetermined computation result using the first transmissivity and the second transmissivity.

4. The paper discriminating device according to claim 1, wherein deriving the discriminating result for types of the paper includes identifying, of two or more ranges in a diagram having a vertical axis and a horizontal axis, a range including coordinates defined by a value based on the first detection value and a value based on the second detection value, the value based on the first detection value corresponding to the vertical axis, and the value based on the second detection value corresponding to the horizontal axis.

5. The paper discriminating device according to claim 4, wherein the two or more ranges are divided, from each other, with a straight line in accordance with a linear function formula.

6. The paper discriminating device according to claim 1, wherein the first wavelength is a wavelength in a range of 800 nm to 900 nm.

7. The paper discriminating device according to claim 1, wherein the second wavelength is a wavelength in a range of 420 nm to 480 nm.

8. The paper discriminating device according to claim 1, wherein the detecting unit comprises a photodiode or a phototransistor having a light sensitivity greater than or equal to a predetermined threshold for all the pieces of light having two or more wavelengths.

9. The paper discriminating device according to claim 1, wherein a light receiving element of the detecting unit is disposed on a substrate mounted with a light source of the light source unit.

10. The paper discriminating device according to claim 1, wherein the detecting unit comprises a single light receiving element that obtains a detection result based on absorption of each of the pieces of light having two or more wavelengths at timing corresponding to each of the pieces of light having two or more wavelengths.

11. The paper discriminating device according to claim 1, wherein the detecting unit includes two or more filters having transmission properties that differ from each other for the pieces of light having two or more wavelengths, and two or more light receiving elements mounted with the two or more filters.

12. The paper discriminating device according to claim 1, wherein the light source unit emits the pieces of light having two or more wavelengths onto a transport path used to transport the paper.

13. The paper discriminating device according to claim 1, wherein the discriminating result for types of the paper is used to discriminate the types between regular paper and recycled or mechanical paper.

14. An image forming apparatus comprising:

the paper discriminating device according to claim 13; and an image forming unit that forms an image on the paper.

15. An image forming apparatus comprising:

the paper discriminating device according to claim 1; and an image forming unit that forms an image on the paper.

16. A paper discriminating device comprising:

a light source unit that emits pieces of light having two or more wavelengths onto paper;

a detecting unit that obtains a detection result based on absorption by the paper of each of the pieces of light having two or more wavelengths; and a control unit that derives a discriminating result for types of the paper provided that the detection result satisfies two or more conditions.

17. The paper discriminating device according to claim 16, wherein the pieces of light having two or more wavelengths include light having a wavelength in a range of 390 nm to 420 nm, light having a wavelength in a range of 420 nm to 500 nm, light having a wavelength in a range of 600 nm to 700 nm, and light having a wavelength in a range of 750 nm to 1100 nm.

18. The paper discriminating device according to claim 17, wherein the pieces of light having two or more wavelengths further include light having a wavelength in a range of 500 nm to 600 nm.

19. The paper discriminating device according to claim 16, wherein the detecting unit comprises a photodiode or a phototransistor having a light sensitivity greater than or equal to a predetermined threshold for all the pieces of light having two or more wavelengths.

20. The paper discriminating device according to claim 16, wherein the light receiving element of the detecting unit is disposed on a substrate mounted with a light source of the light source unit.

21. The paper discriminating device according to claim 16, wherein the detecting unit comprises a single light receiving element that obtains a detection result based on absorption of each of the pieces of light having two or more wavelengths at timing corresponding to each of the pieces of light having two or more wavelengths.

22. The paper discriminating device according to claim 16, wherein the detecting unit includes two or more filters having transmission properties that differ from each other for the pieces of light having two or more wavelengths, and two or more light receiving elements mounted with the two or more filters.

23. The paper discriminating device according to claim 16, wherein the light source unit emits the pieces of light having two or more wavelengths onto a transport path used to transport the paper.

24. The paper discriminating device according to claim 16, wherein the discriminating result for types of the paper is used to discriminate types between regular paper and recycled or mechanical paper.

25. An image forming apparatus comprising:

the paper discriminating device according to claim 16; and an image forming unit that forms an image on the paper.

26. A paper discriminating method comprising:

emitting pieces of light having two or more wavelengths onto paper; and obtaining a detection result based on absorption by the paper of each of the pieces of light having two or more wavelengths, the pieces of light having two or more wavelengths including light having a first wavelength and light having a second wavelength, the detection result including a first detection value based on absorption by the paper of the light having the first wavelength, and a second detection value based on absorption by the paper of the light having the second wavelength, the paper discriminating method further comprising deriving a discriminating result for types of the paper using the first and second detection values, the first wavelength being a wavelength in a range of 750 nm to 1100 nm, and the second wavelength being a wavelength in a range of 400 nm to 500 nm, wherein using the first and second detection values includes calculating, from the first detection value, a first transmissivity which is transmissivity of the light having the first wavelength in the paper;

calculating, from the second detection value, a second transmissivity which is transmissivity of the light having the second wavelength in the paper; and calculating at least one of a ratio or a difference between the first transmissivity and the second transmissivity.

27. A computer-readable recording medium comprising a program stored in a non-transitory manner, the program being executable by a computer to prompt the computer to carry out the paper discriminating method according to claim 26.

28. A paper discriminating method comprising:

emitting pieces of light having two or more wavelengths onto paper;

obtaining a detection result based on absorption by the paper of each of the pieces of light having two or more wavelengths; and deriving a discriminating result for types of the paper provided that the detection result satisfies two or more conditions.

29. A computer-readable recording medium, comprising a program stored in a non-transitory manner, the program being executable by a computer to prompt the computer to carry out the paper discriminating method according to claim 28.

* * * * *